(12) United States Patent
Lee et al.

(10) Patent No.: US 8,085,847 B2
(45) Date of Patent: Dec. 27, 2011

(54) METHOD FOR COMPRESSING/DECOMPRESSING MOTION VECTORS OF UNSYNCHRONIZED PICTURE AND APPARATUS USING THE SAME

(75) Inventors: Kyo-hyuk Lee, Seoul (KR); Sang-chang Cha, Hwaseong-si (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1640 days.

(21) Appl. No.: 11/393,755

(22) Filed: Mar. 31, 2006

(65) Prior Publication Data

US 2006/0221418 A1 Oct. 5, 2006

Related U.S. Application Data

(60) Provisional application No. 60/667,092, filed on Apr. 1, 2005.

(30) Foreign Application Priority Data

May 26, 2005 (KR) .......................... 10-2005-0044594

(51) Int. Cl.
*H04N 7/12* (2006.01)
(52) U.S. Cl. .................................. 375/240.16; 358/539
(58) Field of Classification Search ............. 375/240.05, 375/240.14, 240.16, 240.24
See application file for complete search history.

(56) References Cited

U.S. PATENT DOCUMENTS

| | | | | |
|---|---|---|---|---|
| 5,557,341 A | * | 9/1996 | Weiss et al. ................... 348/699 |
| 5,929,916 A | * | 7/1999 | Legall et al. ............. 375/240.05 |
| 6,339,618 B1 | * | 1/2002 | Puri et al. ................. 375/240.16 |
| 6,510,177 B1 | | 1/2003 | De Bonet et al. |
| 2002/0054578 A1 | * | 5/2002 | Zhang et al. ................... 370/328 |
| 2004/0131121 A1 | | 7/2004 | Dumitras et al. |
| 2005/0084010 A1 | * | 4/2005 | Benetiere et al. ......... 375/240.12 |
| 2005/0213663 A1 | * | 9/2005 | Aoyama et al. .......... 375/240.16 |
| 2008/0043848 A1 | * | 2/2008 | Kuhn ....................... 375/240.16 |

FOREIGN PATENT DOCUMENTS

| | | |
|---|---|---|
| KR | 10-2006-0059773 A | 6/2006 |
| WO | WO 2004/056121 A1 | 7/2004 |
| WO | WO 2004/082293 A1 | 9/2004 |

\* cited by examiner

*Primary Examiner* — David C. Payne
*Assistant Examiner* — Leon-Viet Nguyen
(74) *Attorney, Agent, or Firm* — Sughrue Mion, PLLC

(57) ABSTRACT

A method and apparatus are provided for improving the compression efficiency of motion vectors of an unsynchronized picture by efficiently predicting the motion vectors using motion vectors of a lower layer. The method compresses motion vectors of an unsynchronized picture belonging to a current layer in a video encoder based on a multilayer having at least the current layer and a lower layer of the current layer. The method includes selecting a base picture for the unsynchronized picture, generating a predicted motion vector of the current layer from a motion vector of the base picture, subtracting the predicted motion vector from a motion vector of the unsynchronized picture, and encoding the result of subtraction.

26 Claims, 12 Drawing Sheets

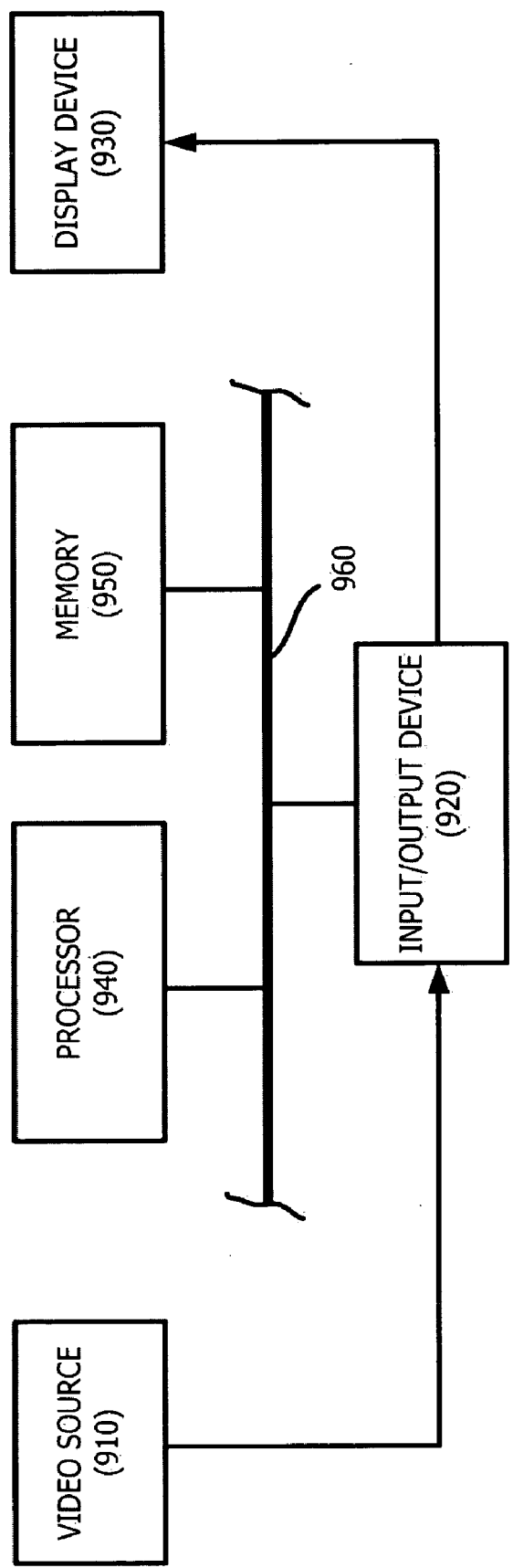

METHOD FOR COMPRESSING/DECOMPRESSING MOTION VECTORS OF UNSYNCHRONIZED PICTURE AND APPARATUS USING THE SAME

CROSS-REFERENCE TO RELATED APPLICATIONS

This application claims priority from Korean Patent Application No. 10-2005-0044594 filed on May 26, 2005 in the Korean Intellectual Property Office, and U.S. Provisional Patent Application No. 60/667,092 filed on Apr. 1, 2005 in the United States Patent and Trademark Office, the disclosures of which are incorporated herein by reference in their entirety.

BACKGROUND OF THE INVENTION

1. Field of the Invention

Methods and apparatuses consistent with the present invention relate to video compression, and more particularly, to improving a compression efficiency of motion vectors of an unsynchronized picture by efficiently predicting the motion vectors using motion vectors of a lower layer.

2. Description of the Prior Art

Currently, with the advancements in information and communication technologies that include the Internet, communications supporting multimedia contents are fast increasing along with text-messaging and voice communication. The existing text-based communication systems are thus far insufficient to meet consumers' diverse needs, and multimedia services that can deliver various forms of information such as texts, images, music, and others, are increasing. Since multimedia data is typically massive in its content, a large storage medium and a wide bandwidth are required for storing and transmitting multimedia data. Accordingly, compression coding techniques are generally applied to transmit multimedia data including texts, image and audio data.

Generally, data compression is applied to remove data redundancy. Here, data can be compressed by removing spatial redundancy such as a repetition of the same color or object in pictures, temporal redundancy such as a little or no change in adjacent frames of moving pictures or a continuous repetition of sounds in audio, and a visual/perceptual redundancy, which considers human visual and perceptive insensitivity to high frequencies. In conventional video encoding methods, the temporal redundancy is removed by a temporal prediction based on motion compensation, while the spatial redundancy is removed by a spatial transform.

After removing the redundancies, multimedia data is transmitted over a transmission medium or a communication network, which may differ in terms of performance, as existing transmission mediums have varying transmission speeds. For example, an ultra high-speed communication network can transmit several tens of megabits of data per second, while a mobile communication network has a transmission speed of 384 kilobits per second. In order to support the transmission medium in such transmission environments and to transmit multimedia data stream with a transmission rate suitable for a transmission environment, a scalable video encoding method is implemented.

Such a scalable video encoding method makes it possible to truncate a portion of compressed bit stream and to adjust the resolution, frame rate and signal-to-noise ratio (SNR) of a video corresponding to the truncated portion of the bit stream. With respect to the scalable video coding, MPEG-4 Part 10 has already progressed its standardization work. Particularly, much research for implementing scalability in a video encoding method based on a multilayer has already been carried out. As an example of such a multilayered video coding, a multilayer structure is composed of a base layer, a first enhancement layer and a second enhancement layer, and the respective layers have different resolutions QCIF, CIF and 2CIF, and different frame rates.

Similarly with a single layer-based coding, in a multilayer-based coding, it is required to obtain motion vectors (MVs) on a layer basis to remove the temporal redundancy. The motion vectors may be separately searched and used for each layer, or may be searched in one layer and used (as they are or after being up/down-sampled) in other layers. The former case has both an advantage of searching and obtaining exact motion vectors and a disadvantage of serving the motion vectors generated for each layer as an overhead. Accordingly, in the former case, it is important to remove the redundancy between the motion vectors for the respective layers more efficiently.

At present, Joint Video Team (JVT), a cooperation between Moving Picture Experts Group (MPEG) of International Organization for Standardization/International Electrotechnical Commission (ISO/IEC) and Video Coding Experts Group (VCEG) of International Telecommunications Union (ITU), has been researching a moving picture coding method that is the kernel of the next generation multimedia service. In particular, regarding the scalable video coding, a draft document of "Joint Scalable Video Model (JSVM) 1.0 document (Hong Kong, January, 2005)" has already been prepared and continuous technological supplements based on the draft document are under progress.

The JSVM 1.0 standard uses the scalable video coding method using a multilayer. However, an H. 264 method is adopted as an encoding method for each layer constituting the multilayer, and motion compensated temporal filtering (MCTF) is adopted as a method for embodying a temporal scalability in each layer.

FIG. 1 illustrates an example of a scalable video coding structure having two layers.

In FIG. 1, a white tetragon indicates a low frequency picture, and a black tetragon indicates a high frequency picture. In the coding structure, the upper layer has a frame rate of 30 Hz, and includes a plurality of temporal levels (four in number) according to a hierarchical MCTF separating process. In the same manner, a lower layer has a frame rate of 15 Hz, and includes temporal levels (three in number).

The JSVM 1.0 standard discloses a technique for predicting motion vectors of an a picture of an upper layer using a picture of a lower layer which has a temporal position, i.e., a picture order count (POC), which is consistent with the POC of any one of the upper layer pictures. For example, motion vectors of high frequency pictures 15 and 16 of the upper layer of FIG. 1 can be efficiently predicted from motion vectors of high frequency pictures 17 and 18 of the lower layer each having the same temporal position. Since they have the same temporal positions, their motion vectors can also be expected to be similar to each other.

Although the motion vectors of the pictures having corresponding lower layer pictures such as the pictures 15 and 16 (hereinafter referred to as "synchronized pictures") can be efficiently predicted using the motion vectors of lower layer pictures, it is difficult apply the above-described motion vector prediction method to the pictures having no corresponding lower layer pictures such as high frequency pictures 11, 12, 13 and 14 existing at temporal level 3 (hereinafter referred to as "unsynchronized pictures"). Thus, only a method of independently encoding motion vectors and a method of encoding motion vectors using the spatial relationship between the motion vectors are being used.

SUMMARY OF THE INVENTION

The present invention provides a method and apparatus capable of more efficiently encoding motion vectors of an picture having no corresponding lower layer picture.

The present invention also provides a method and apparatus capable of efficiently predicting motion vectors of an unsynchronized picture from motion vectors of a lower layer in a scalable video codec based on a multilayer having MCTF structures.

The present invention also provides a syntax that is modified to adapt a motion vector prediction technique of an unsynchronized picture to a JSVM.

According to an aspect of the present invention, there is provided a method for compressing motion vectors of an unsynchronized picture belonging to a current layer in a video encoder based on a multilayer having at least the current layer and a lower layer of the current layer, the method including selecting a base picture for the unsynchronized picture; generating a predicted motion vector of the current layer from a motion vector of the base picture; subtracting the predicted motion vector from a motion vector of the unsynchronized picture; and encoding the result of subtraction.

According to another aspect of the present invention, there is provided a method for decompressing motion vectors of an unsynchronized picture belonging to a current layer in a video decoder based on a multilayer having at least the current layer and a lower layer of the current layer, the method including selecting a base picture for the unsynchronized picture; generating a predicted motion vector of the current layer from a motion vector of the base picture; and adding a motion vector difference for the unsynchronized picture to the predicted motion vector.

BRIEF DESCRIPTION OF THE DRAWINGS

The above and other aspects of the present invention will be more apparent from the following detailed description of exemplary embodiments taken in conjunction with the accompanying drawings, in which:

FIG. 13 is a diagram illustrating the construction of a system for performing an operation of a video encoder or a video decoder according to an exemplary embodiment of the present invention.

DETAILED DESCRIPTION OF THE EXEMPLARY EMBODIMENTS

Figure 1:
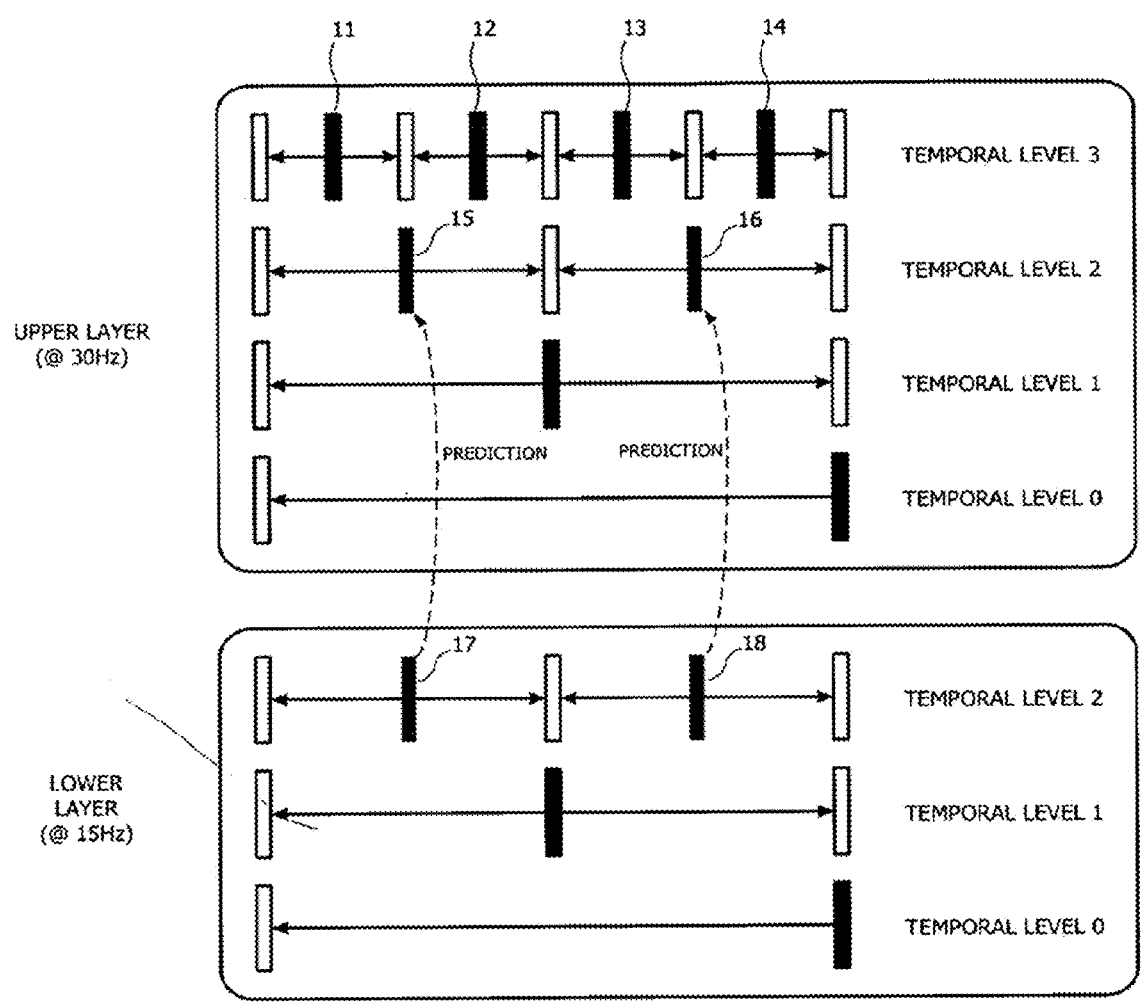
FIG. 1 illustrates an example of a scalable video coding structure having two layers.

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in various forms with departing from the spirit and scope of the invention. The matters defined in the description, such as the detailed construction and elements are specific details provided to assist those having ordinary skill in the art in a comprehensive understanding of the invention. Throughout the description of the present invention and in the accompanying drawings, the same reference numerals are used for the same elements.

The present invention provides a method for selecting a lower layer picture (hereinafter referred to as "base picture") used to predict motion vectors of an unsynchronized picture having no corresponding lower layer picture. Further, the present invention provides a method for predicting the motion vector of the unsynchronized picture using a motion vector of the selected lower layer picture.

Figure 2:
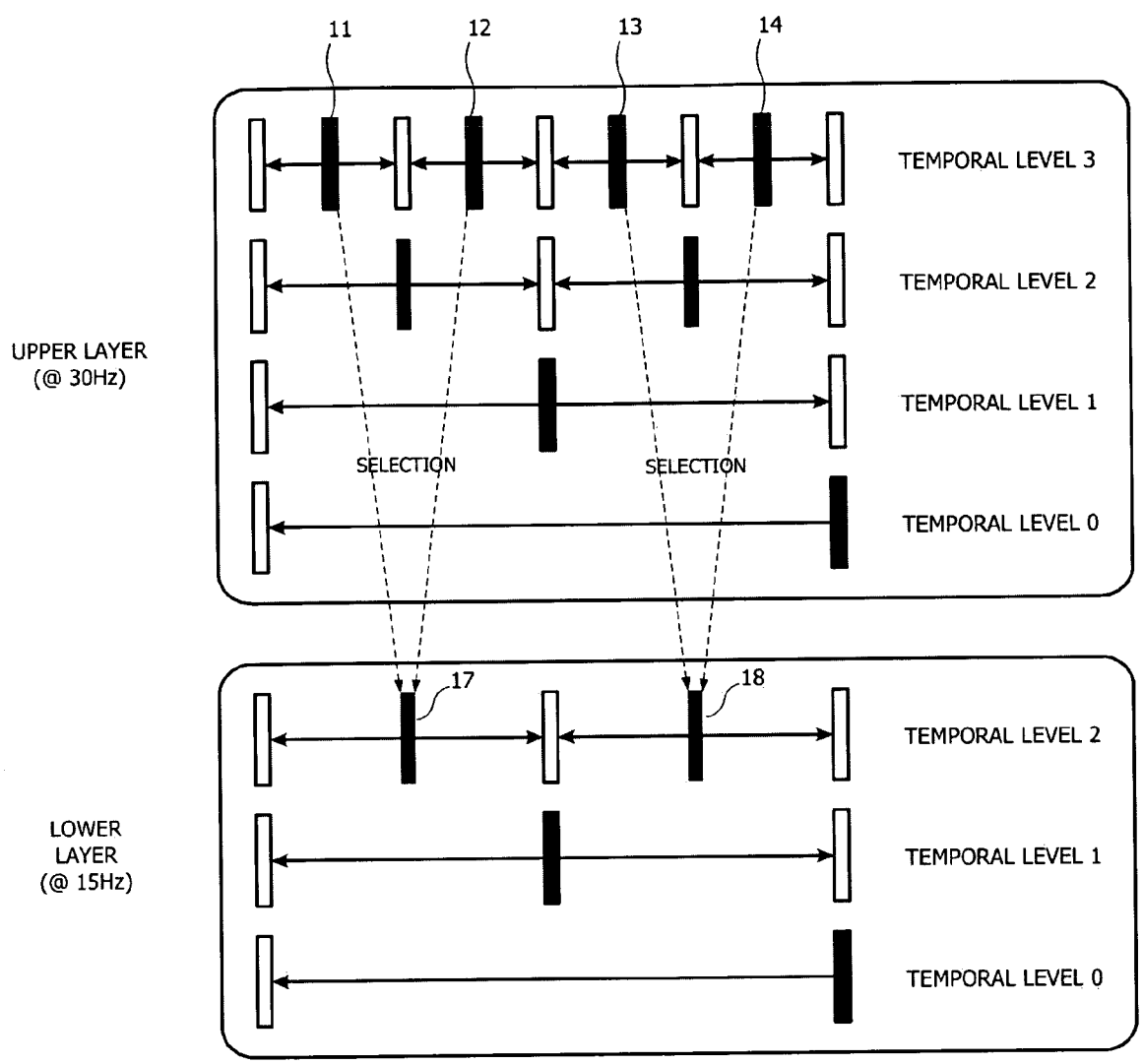
FIG. 2 illustrates a method for selecting a lower layer picture used to predict motion vectors of an unsynchronized picture according to an exemplary embodiment of the present invention.

FIG. 2 illustrates a method for selecting a lower layer picture used to predict motion vectors of an unsynchronized picture according to an exemplary embodiment of the present invention. Due to the absence of a corresponding lower layer picture, unsynchronized pictures 11, 12, 13, and 14 need to be determined as to whether an picture corresponding to any condition, as a "base picture", from a plurality of lower layer pictures should be selected.

Selection of the base picture can be based on whether to satisfy the following three conditions.

1. To be a high frequency picture existing at an uppermost temporal level among the lower layer pictures
2. To have the smallest POC difference from a current unsynchronized picture
3. To be within the same Group of Pictures (GOP) as the current unsynchronized picture First, the condition 1 of targeting the picture existing at the uppermost temporal level is because reference lengths of motion vectors of such pictures are the shortest. As the reference length is lengthened, error in predicting the motion vector of the unsynchronized picture increases. Further, the condition 1 of limiting to the high frequency picture makes it possible to predict the motion vector only when the base picture has the motion vector.

The condition 2 of having the smallest POC difference from the current unsynchronized picture is to provide the smallest temporal distance between the current unsynchronized picture and the base picture. The pictures in a close temporal distance have a greater possibility of having more similar motion vectors. If there are two or more of lower layer pictures having the same POC difference in the condition 2, the lower layer picture having a smaller POC can be selected from the two or more of lower layer pictures as the base picture.

The condition 3 of existing within the same GOP as the current unsynchronized picture allows an encoding process to be delayed when a base layer is referred beyond the GOP. Accordingly, the condition 3 can be omitted in an environment which does not present a problem, although the encoding process can be delayed.

A process of selecting the base picture for the unsynchronized pictures 11, 12, 13, and 14 of FIG. 2 according to the above three conditions is as follows. As the base picture of the unsynchronized picture 11, a high frequency picture 17 having a smaller POC difference, that is, a closer temporal position is selected from high frequency pictures 17 and 18 existing at the uppermost temporal level (temporal level 2) in the lower layer. Similarly, the high frequency picture 17 is selected as the base picture of the unsynchronized picture 12, and the high frequency picture 18 is selected as the base picture of the unsynchronized pictures 13 and 14.

On the assumption that the base picture of the unsynchronized picture is selected as above, a method for actually predicting the motion vector of the unsynchronized picture using the motion vector of the base picture is determined.

FIGS. 3 to 6 illustrate processes of predicting motion vectors of the unsynchronized picture 31 using the motion vector of a base picture 32, that is, processes of generating a predicted motion vector for an unsynchronized picture 31. However, since two motion vectors of a base picture 32 such as forward and reverse motion vectors may exist, it should be also determined whether to select the forward or reverse motion vector.

In the present invention, if the result of subtracting the POC of the base picture from the POC of the unsynchronized picture (hereinafter referred to as "POC difference") is negative, a forward motion vector $M_{Of}$ is selected, and if it is positive, a reverse motion vector $M_{Ob}$ is selected. Here, it is efficient to use the motion vector positioned at a closer side when the motion vector is predicted.

Figure 3:
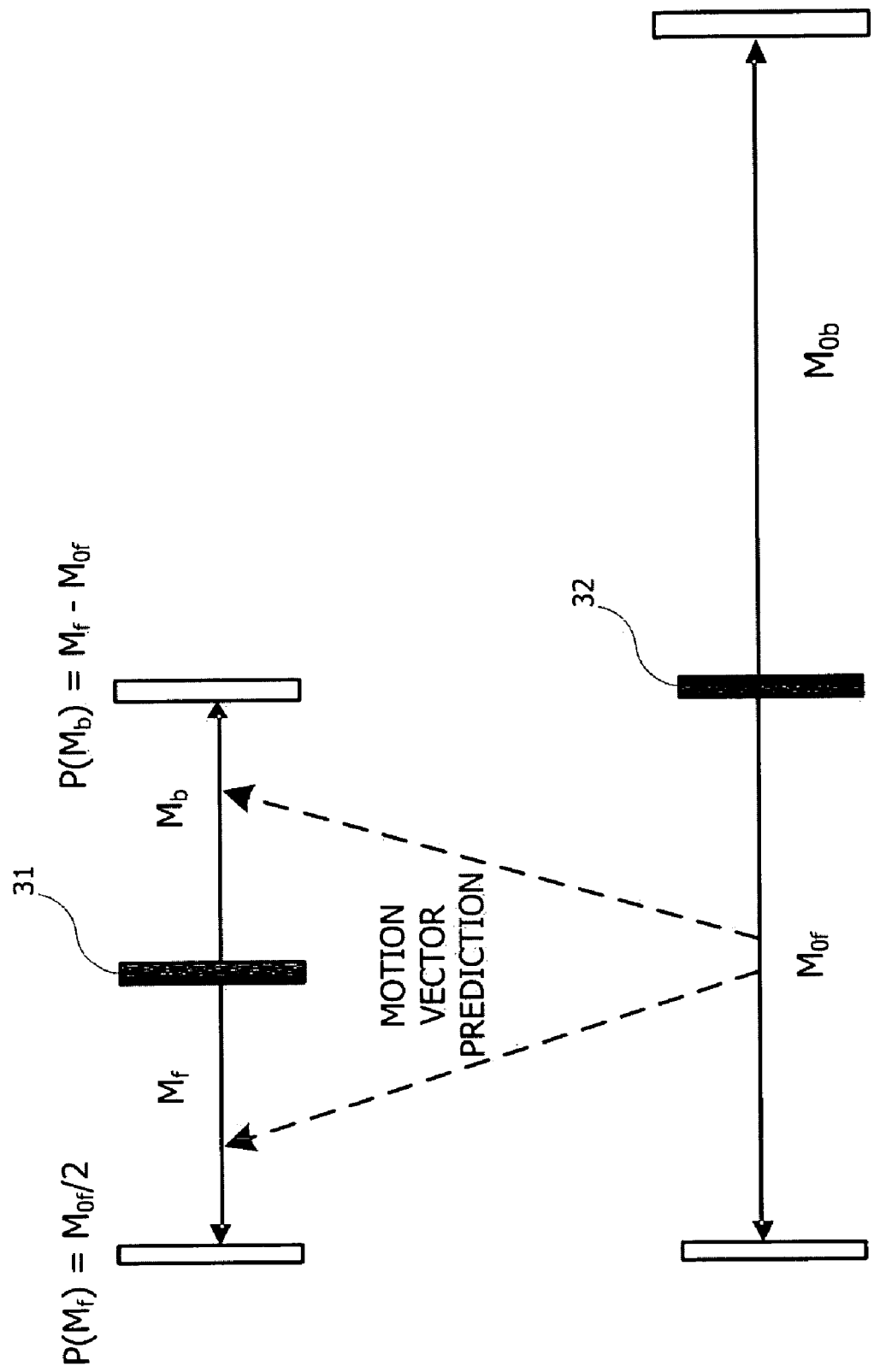
FIG. 3 illustrates a case where both a base picture and an unsynchronized picture have bidirectional motion vectors while a picture order count (POC) difference is positive.

FIG. 3 illustrates a case where both the base picture and the unsynchronized picture have bidirectional motion vectors while the (POC) difference is positive. In this case, motion vectors $M_f$ and $M_b$ of the unsynchronized picture 31 are predicted from the forward motion vector $M_{Of}$ of the base picture 32, and as a result, a predicted motion vector $P(M_f)$ for the forward motion vector $M_f$ and a predicted motion vector $P(M_b)$ for the reverse motion vector $M_b$ are respectively obtained.

In a general case, an object moves at a predetermined direction and velocity. In particular, when a background continuously moves or a specific object is observed for a short time, such a property is satisfied in many cases. Accordingly, it can be predicted that the result of $M_f$-$M_b$ is similar with the forward motion vector $M_{Of}$. Further, in a real circumstance, in many cases, it is found that the $M_f$ and the $M_b$ have mutually opposite directions and have similar absolute values of magnitudes. This is because the object moving velocity does not vary greatly in a short temporal duration. Accordingly, $P(M_f)$ and $P(M_b)$ can be defined as follows in Equation (1).

$$P(M_f)=M_{Of}/2$$

$$P(M_b)=M_f-M_{Of} \qquad (1)$$

In Equation (1), it can be appreciated that $M_f$ is predicted using $M_{Of}$, and $M_b$ is predicted using $M_f$ and $M_{Of}$. However, even when only a unidirectional prediction is performed for the unsynchronized picture 31, i.e., a case when the unsynchronized picture 31 has either $M_f$ or $M_b$, can be considered. This is because a video codec may adaptively select the most appropriate one from forward, reverse, and bidirectional references depending on the efficiency of compression.

In the case where the unsynchronized picture has only the forward reference, it does not present a problem to use only the first of Equation (1). However, in the case of having only the reverse reference, that is, in the case where only $M_b$ exists without $M_f$, Equation for obtaining $P(M_b)$ in Equation (1) cannot be used. In this case, by using that $M_f$ would be similar with $-M_b$, $P(M_b)$ can be expressed as follows in Equation (2).

$$P(M_b)=M_f-M_{Of}=-M_b-M_{Of} \qquad (2)$$

In this case, the difference between $M_b$ and its prediction value $P(M_b)$ can be expressed as "$2 \times M_b + M_{Of}$".

Figure 4:
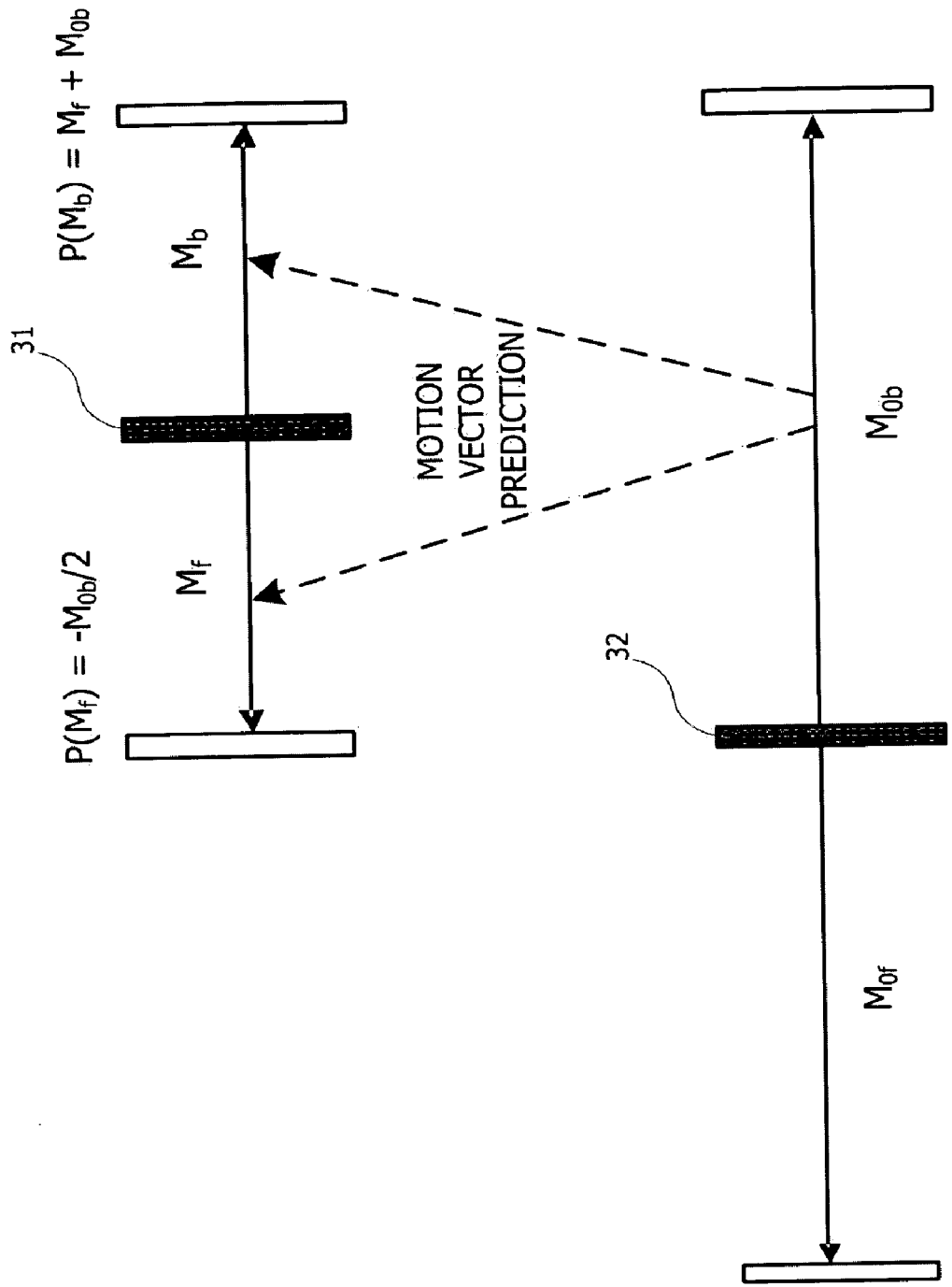
FIG. 4 illustrates a case where both a base picture and an unsynchronized picture have bidirectional motion vectors while a POC difference is negative.

FIG. 4 illustrates a case where both the base picture and the unsynchronized picture have bidirectional motion vectors while the POC difference is negative.

The motion vectors $M_f$ and $M_b$ of the unsynchronized picture 31 are predicted from the reverse motion vector $M_{Ob}$ of the base picture 32, and as a result, the predicted motion vector $P(M_f)$ for the forward motion vector $M_f$ and the predicted motion vector $P(M_b)$ for the reverse motion vector $M_b$ are obtained respectively.

Accordingly, $P(M_f)$ and $P(M_b)$ can be defined as follows in Equation (3).

$$P(M_f)=-M_{Ob}/2$$

$$P(M_b)=M_f+M_{Ob} \qquad (3)$$

In Equation (3), $M_f$ is predicted using $M_{Ob}$, and $M_b$ is predicted using $M_f$ and $M_{Ob}$. In the case where the unsynchronized picture 31 has only the reverse reference, that is, in the case where only $M_b$ exists without $M_f$, equation for obtaining $P(M_b)$ in Equation (3) cannot be used. Therefore, $P(M_b)$ can be modified as follows in Equation (4).

$$P(M_b)=M_f-M_{Ob}=-M_b-M_{Ob} \qquad (4)$$

Unlike the exemplary embodiment of FIGS. 3 and 4, the base picture 32 may have a unidirectional motion vector. In this case, since only one motion vector to be referred to exists, it is not required to calculate the POC difference and select the motion vector to be referred to.

Figure 5:
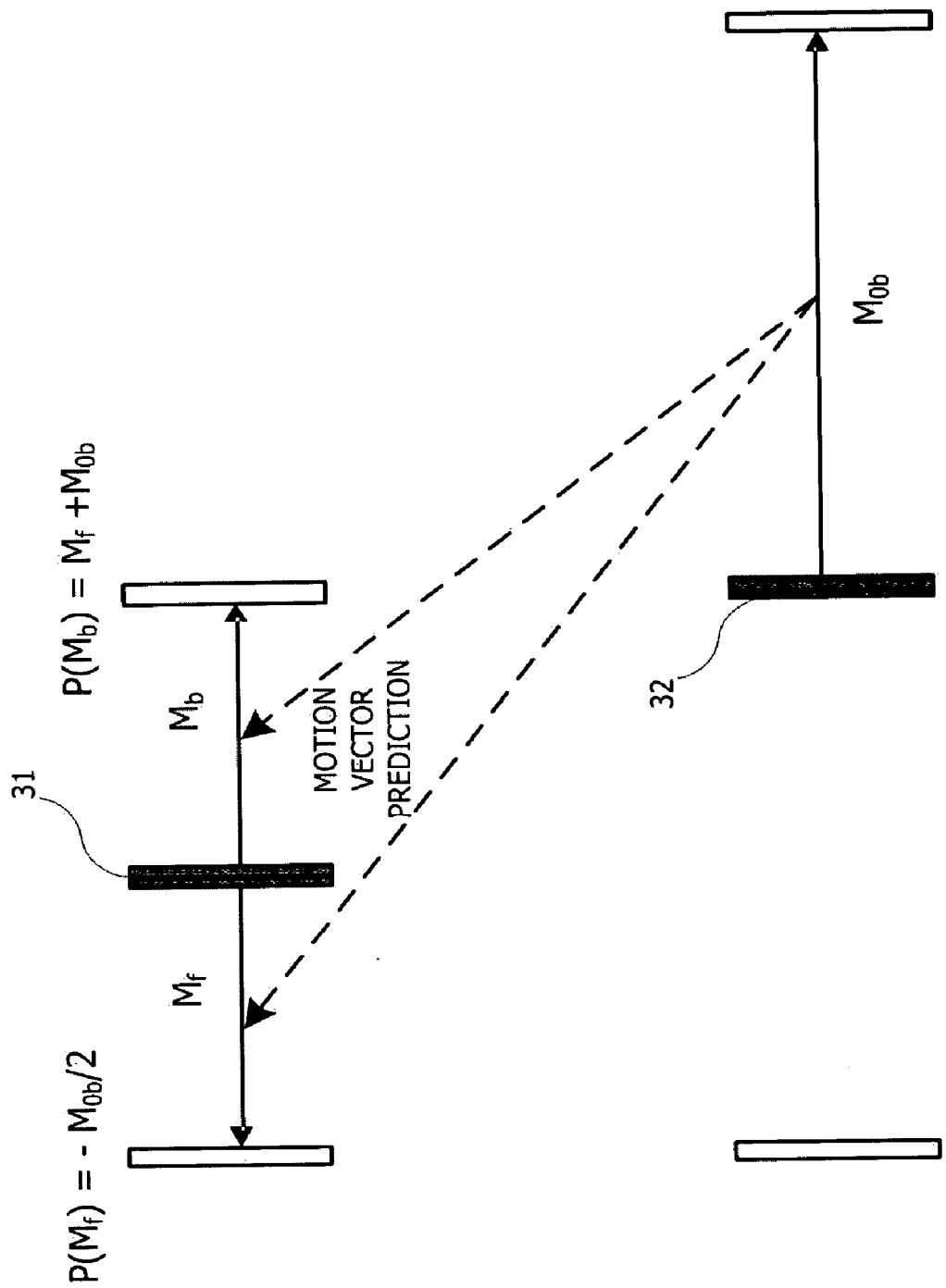
FIG. 5 illustrates a case where a base picture has only a reverse motion vector in an environment as in FIG. 3.
Figure 6:
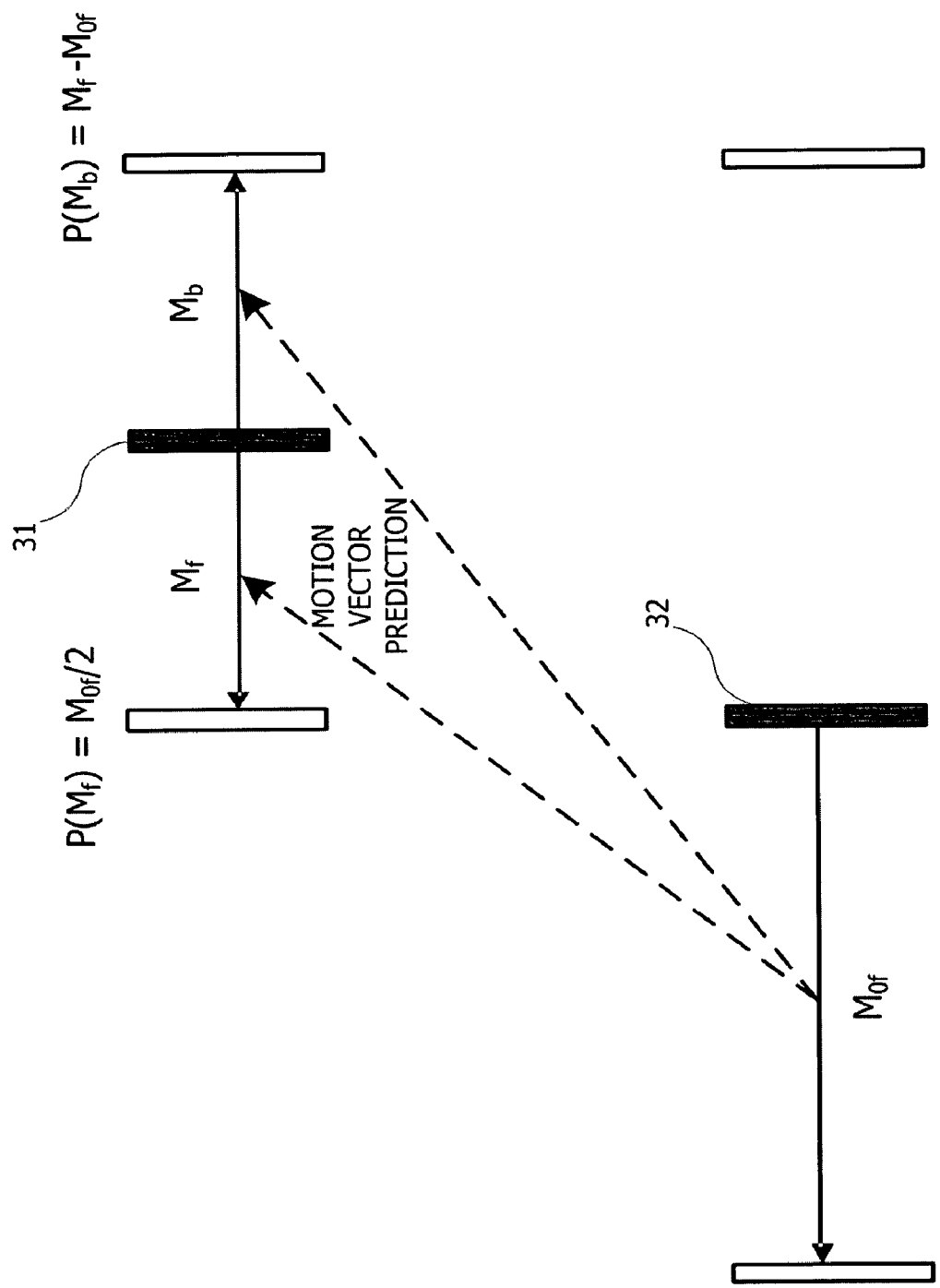
FIG. 6 illustrates a case where a base picture has only a reverse motion vector in an environment as in FIG. 4.

FIG. 5 illustrates a case where the base picture has only the reverse motion vector $M_{Ob}$ in an environment as in FIG. 3. In this case, the predicted motion vectors $P(M_f)$ and $P(M_b)$ for the motion vectors $M_f$ and $M_b$ of the unsynchronized picture 31 can be determined by the same relational expression as Equation (3). Similarly, in FIG. 6 illustrating a case where the base picture has only the forward motion vector $M_{Of}$ in a circumstance as in FIG. 4, the predicted motion vectors $P(M_f)$ and $P(M_b)$ for the motion vectors $M_f$ and $M_b$ of the unsynchronized picture 31 can be determined by the same relational expression of Equation (1).

In the exemplary embodiment of FIGS. 3 to 6, it is assumed that a reference distance of the motion vector of the base picture (temporal distance between any one picture and its reference picture, capable of being expressed by the POC difference) is twice the reference distance of the unsynchronized picture. However, this may vary.

Here, the predicted motion vector $P(M_f)$ for the forward motion vector $M_f$ of the unsynchronized picture can be obtained by multiplying the motion vector $M_o$ of the base picture by a reference distance coefficient d. The magnitude of the reference distance coefficient d is a value obtained by dividing the reference distance of the unsynchronized picture by the reference distance of the base picture. If the reference direction is the same, the reference distance coefficient d has a positive value, and otherwise, it has a negative value.

The predicted motion vector $P(M_b)$ for the reverse motion vector $M_b$ of the unsynchronized picture can be obtained by subtracting the motion vector of the base picture from the forward motion vector $M_f$ of the unsynchronized picture when the motion vector of the base picture is the forward motion vector. When the motion vector of the base picture is the reverse motion vector, the predicted motion vector $P(M_b)$ can be obtained by adding the forward motion vector $M_f$ of the unsynchronized picture and the motion vector of the base picture.

FIGS. 3 to 6 illustrate different cases where the motion vectors of the unsynchronized picture are predicted through the motion vector of the base picture. However, since temporal positions of a low temporal level frame 31 and a high temporal level frame 32 correspond to each other, there is a need to determine whether the motion vectors positioned at any one partition mutually correspond to each other within one picture. This determination can be implemented by the following methods.

Figure 7:
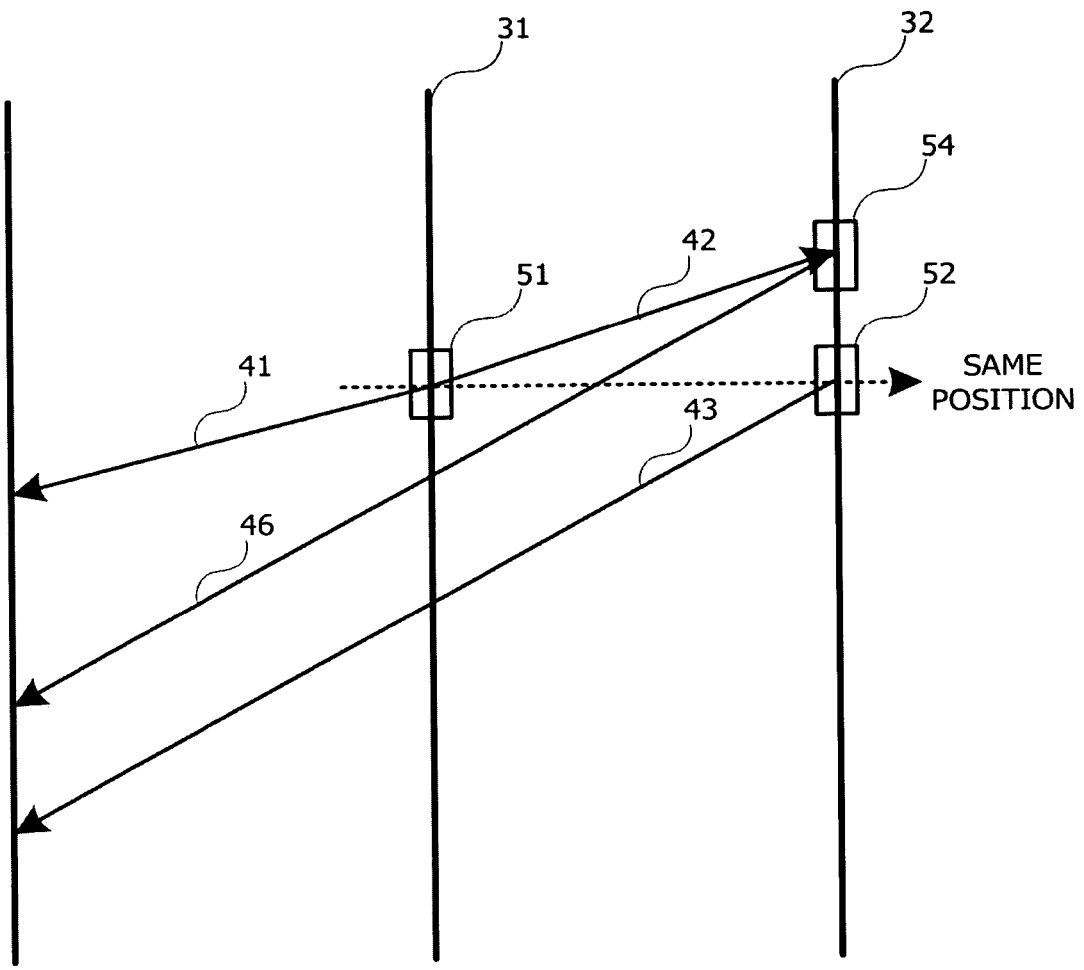
FIG. 7 is a diagram illustrating a corresponding relation between interlayer motion vectors.

First, a method of simply making the motion vectors correspond to each other at the same position can be used. Referring to FIG. 7, a motion vector 52 allocated to a block 52 within the base picture 32 can be used to predict motion vectors 41 and 42 allocated to a block 51 of the same position as the block 52 in the unsynchronized picture 31.

Alternatively, a method of predicting the motion vector after correcting an inconsistent temporal position can be considered. In FIG. 7, according to a profile of the reverse motion vector 42 at the block 51 within the unsynchronized picture 31, the motion vector 46 in a corresponding region 54 of the base picture 32 can be used to predict the motion vectors 41 and 43 of the base picture 32. However, the region 54 may not be consistent with a unit of block to which the motion vector is allocated respectively, but an area weighted average or a median value can be obtained, thereby obtaining one representative motion vector 46.

Figure 8:
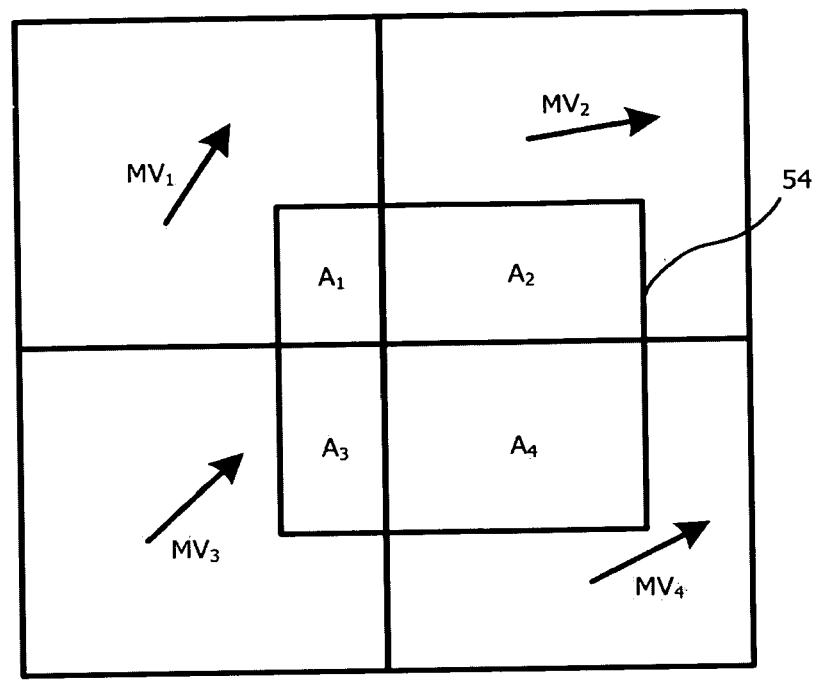
FIG. 8 illustrates measures to be implemented when a corresponding region of a base picture is not consistent with a block to which a motion vector is allocated.

For example, assuming that the region 54 is at a position that overlaps four blocks as in FIG. 8, the representative motion vector (MV) for the region 54 can be obtained by Equation (5) when using an area weighted average, and by Equation (6) when using a median operation. In the case of the bidirectional reference, two types of motion vectors exist, and thus operations for each of the motion vectors are performed.

$$MV = \frac{\sum_{i=1}^{4} A_i \times MV_i}{\sum_{i=1}^{4} A_i} \quad (5)$$

$$MV = \text{median}(MV_i) \quad (6)$$

Meantime, even in the MCTF, a case where the forward reference distance and the reverse reference distance are different from each other may occur. In the MCTF supporting a multiple reference, such a case may occur. In this case, it is preferable that $P(M_f)$ and $P(M_b)$ are calculated with a weighting value considered.

In the case where the motion vector of the base picture 32 referred as in FIG. 3 is the forward motion vector $M_{Of}$, the predicted motion vector $P(M_f)$ is obtained by a relational expression of $P(M_f)=a \times M_b/(a+b)$, and the predicted motion vector $P(M_b)$ is obtained by a relation expression of $P(M_b)=M_f-M_{bf}$. Here, "a" denoting a forward distance rate is a value obtained by dividing a forward reference distance by a sum of the forward reference distance and the reverse reference distance, and "b" denoting a reverse distance rate is a value obtained by dividing the reverse reference distance by the sum of the distances. Even in FIG. 4, similarly, the predicted motion vectors $P(M_f)$ and $P(M_b)$ can be obtained considering the reference distance.

Until now, it is assumed that, although the lower layer and the upper layer have different frame rates, they have the same resolution. However, a case where the upper layer has a higher resolution than the lower layer may occur. In this case, Equations (1) to (4) should be modified. In Equations (1) and (3), the reference distance of the base picture 32 is two times the reference distance of the unsynchronized picture 31, and the resolution between the base picture 32 and the unsynchronized picture 31 is the same and, therefore, $P(M_f)$ can be expressed as $M_{Of}/2$ or $-M_{Ob}/2$. However, assuming that the resolution of the unsynchronized picture 31 is "r" times the resolution of the base picture 32, Equations (1) to (4) should be modified as follows in Equations (7) to (10), respectively. That is, in Equations (1) to (4), the motion vectors $M_{Of}$ and $M_{Ob}$ of the base picture are substituted with $r \times M_{Of}$ and $r \times M_{Ob}$, respectively. That is because, when a resolution multiple is "r", the magnitude of a corresponding motion vector should also be larger accordingly.

$$P(M_f)=r \times M_{Of}/2$$

$$P(M_b)=M_f-r \times M_{Of} \quad (7)$$

$$P(M_b)-M_b-r \times M_{Of} \quad (8)$$

$$P(M_f)=-r \times M_{Ob}/2$$

$$P(M_b)=M_f-r \times M_{Ob} \quad (9)$$

$$P(M_b)=-M_f+r \times M_{Ob} \quad (10)$$

In the above, a description of the methods for deciding the predicted motion vector for the unsynchronized picture 31 of the upper layer using the base picture 32 of the lower layer is made. If the predicted motion vectors $P(M_f)$ and $P(M_b)$ are obtained through the above process, the obtained vectors can be applied to a motion estimation process, and can be used to efficiently compress the motion vectors, thereby reducing the amount of a bit stream to be transmitted.

Figure 9:
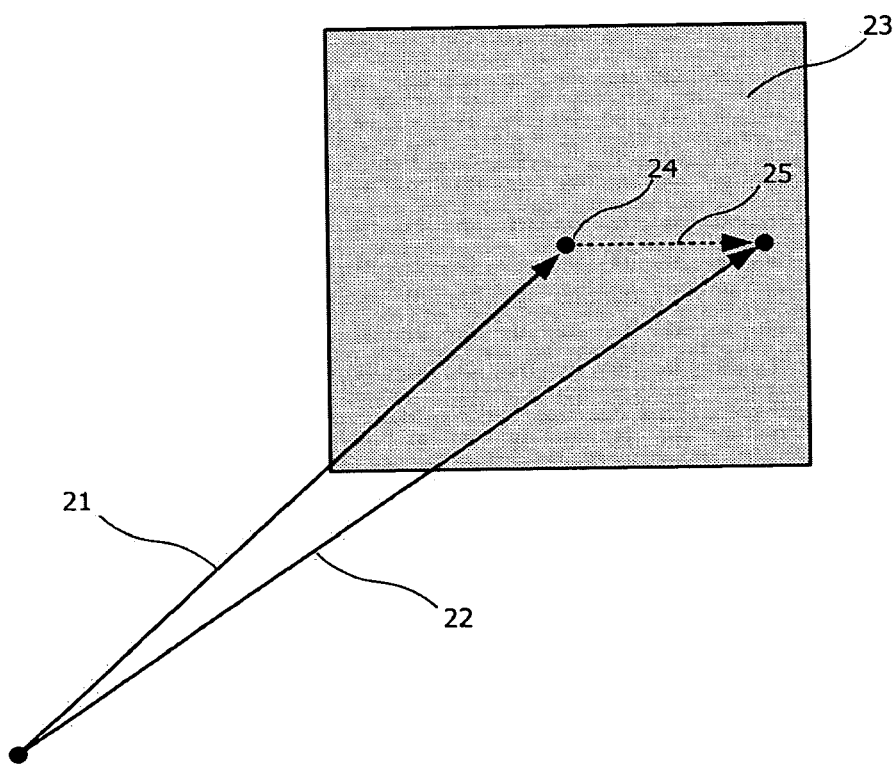
FIG. 9 illustrates an example of a motion search area and an initial position when a motion is estimated.

FIG. 9 illustrates an example of a motion search area 23 and an initial position 24 when a motion is estimated. As a method for searching for the motion vector, there are a full area search method for searching a whole picture for the motion vector and a local area search method for searching a predetermined search area for the motion vector. The motion vector is used to reduce a texture difference by adopting more similar texture block. However, since the motion vector itself is a part of data that is transmitted to a decoder side and a lossless encoding method is mainly used, a considerable amount of bits is allocated to the motion vector. Accordingly, reduction in the bit amount of the motion vector, no less than reduction of the bit amount of texture data, has influence on the video compression performance. Accordingly, most video codecs limit the magnitude of the motion vector mainly using the local area search method.

If the motion vector search is performed within the motion search area 23 with a more accurate predicted motion vector 24 provided as an initial value, the amount of calculation performed for the motion vector search and a difference 25 between the predicted motion vector as well as the actual motion vector can be reduced. In the present invention, the predicted motion vectors $P(M_f)$ and $P(M_b)$ obtained using the base picture can be used as the initial value for performing motion estimation on the unsynchronized picture.

Through such motion estimation process, the actual motion vectors $M_f$ and $M_b$ of the unsynchronized picture can be obtained. After the motion vectors $M_f$ and $M_b$ of the unsynchronized picture are obtained, a process of encoding and expressing the motion vectors $M_f$ and $M_b$, thereby reducing the amount of data of the motion vector, that is, a process of quantizing the motion vector for the motion vector of the unsynchronized picture is performed.

The process of quantizing the motion vectors $M_f$ and $M_b$ can be performed through a method of simply obtaining the difference between the motion vectors $M_f$ and $M_b$ and the predicted motion vector. Accordingly, the result of quantizing $M_f$ can be expressed as "$M_f - P(M_f)$", and the quantization result of $M_b$ can be expressed as "$M_b - P(M_b)$". If the unsynchronized picture uses only a unidirectional reference, only one of both motion vectors $M_f$ and $M_b$ can be also quantized.

However, it should be considered whether a macroblock pattern of the base picture and a macroblock pattern of the unsynchronized picture are identical to each other. Since both of the macroblock patterns are identical, the obtained motion vector and the predicted motion vector correspond to each other on a point-to-point basis and therefore, it is not problematic that, when a motion of the unsynchronized picture is estimated, the macroblock pattern of the base picture is used without change and the predicted motion vector is refined, thereby obtaining the motion vector of the unsynchronized picture. In contrast, in the case where, when the motion of the unsynchronized picture is estimated, an optimal macroblock pattern and the motion vector are determined independently of the macroblock pattern of the base picture, the determined motion vector and the predicted motion vector may not correspond to each other on a point-to-point basis.

For example, in the case where the macroblock patterns are not consistent with each other as in FIG. 10, the predicted motion vector $P(M_f)$ of the unsynchronized picture can be obtained from the area weighted average of the respective predicted motion vectors $(P(M_f)_i$ where "i" denotes index) included in corresponding partitions of the base picture as follows in Equation (11).

$$P(M_f) = \frac{\sum_{i=1}^{5} A_i \times P(M_f)_i}{\sum_{i=1}^{5} A_i} \tag{11}$$

Or, it can be also obtained using the median operation as follows in Equation (12).

$$P(M_f) = \mathrm{median}\,[P(M_f)_i] \tag{12}$$

Figure 10:
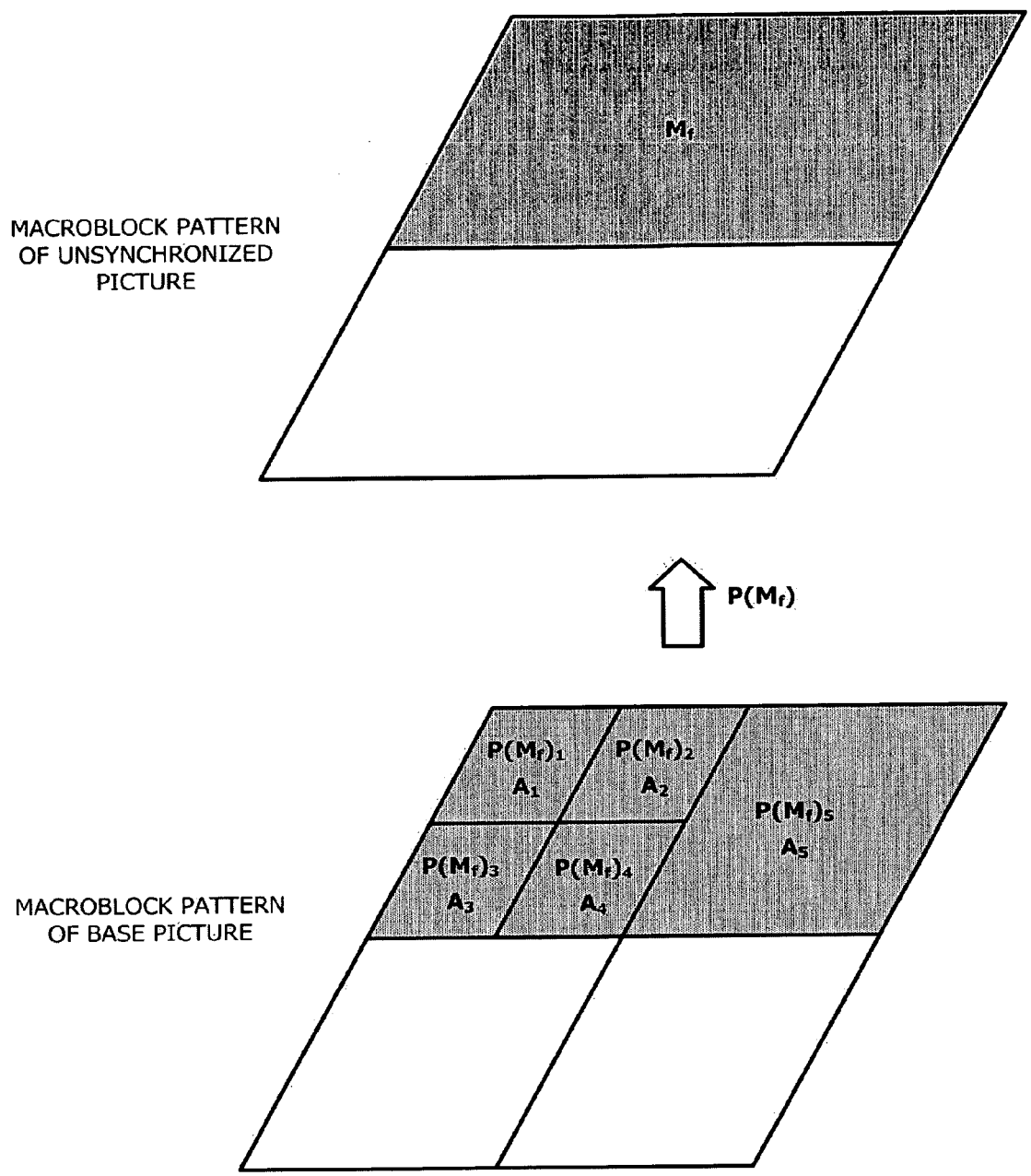
FIG. 10 illustrates measures to be implemented when a macroblock pattern is not consistent between layers.

In the case where any partition of the macroblock pattern of the base picture includes partitions of a corresponding unsynchronized picture in contrast to the case in FIG. 10, the predicted motion vector of the partition of the base picture is used as it is as the predicted motion vector for the partitions.

Modification of Syntax in JSVM 1.0 Document

Hereinafter, in order to perform the motion vector prediction for the unsynchronized picture as described above, the syntax of a conventional JSVM 1.0 document is modified. "Macroblock layer in scalable extension syntax" according to the conventional JSVM 1.0 document is shown in Table 1 below.

TABLE 1

| | C | Descriptor |
|---|---|---|
| macroblock_layer_in_scalable_extension( ) { | | |
|   if( base_layer_id_plus1 != 0 && adaptive_prediction_flag) | | |
|   { | | |
|     base_layer_mode_flag | 2 | ae(v) |
|     if( ! base_layer_mode_flag && HalfResolutionBaseLayer && | | |
|       ! IntraBaseLayerMacroblock ) | | |
|     base_layer_refinement_flag | 2 | ae(v) |
|   } | | |
|   if( ! base_layer_mode_flag && ! base_layer_refinement_flag ) { | | |
|     mb_type | 2 | ae(v) |
|     if(mb_type = = I_NxN && base_layer_id_plus1 != 0 ) | | |
|       intra_base_flag | 2 | ae(v) |
|   } | | |
|   if( MbType = = I_PCM ) { | | |
|     while( !byte_aligned( ) ) | | |
|       pcm_alignment_zero_bit | 2 | f(1) |
|     for( i = 0; i < 256; i++ ) | | |
|       pcm_sample_luma[ i ] | 2 | u(v) |
|     for( i = 0; i < 2 * MbWidthC * MbHeightC; i++ ) | | |
|       pcm_sample_chroma[ i ] | 2 | u(v) |
|   } else { | | |
|     NoSubMbPartSizeLessThan8x8Flag = 1 | | |
|     if( MbType != I_NxN && MbType != I_BL && | | |
|       MbPartPredMode( MbType, 0 ) != Intra_16x16 && | | |
|       NumMbPart( MbType ) = = 4 ) { | | |
|       if( ! base_layer_mode_flag ) | | |
|         sub_mb_pred_in_scalable_extension( MbType ) | 2 | |
|       for( mbPartIdx = 0; mbPartIdx < 4; mbPartIdx++ ) | | |
|         if( SubMbType[ mbPartIdx ] != B_Direct_8x8 ) { | | |
|           if( NumSubMbPart( SubMbType[ mbPartIdx ] ) > 1 ) | | |
|             NoSubMbPartSizeLessThan8x8Flag = 0 | | |
|         } else if( !direct_8x8_inference_flag ) | | |

TABLE 1-continued

| | C | Descriptor |
|---|---|---|
|            NoSubMbPartSizeLessThan8×8Flag = 0<br>    } else {<br>        if( transform_8×8_mode_flag && MbType = = I_N×N )<br>            transform_size_8×8_flag | 2 | ae(v) |
|        mb_pred_in_scalable_extension( MbType ) | 2 | |
|    }<br>    if( MbPartPredMode( MbType, 0 ) != Intra_16×16 ) {<br>        coded_block_pattern | 2 | ae(v) |
|        if( CodedBlockPatternLuma > 0 &&<br>            transform_8×8_mode_flag && MbType != I_N×N &&<br>            NoSubMbPartSizeLessThan8×8Flag &&<br>            !( MbPartPredMode( MbType, 0 ) == B_Direct_16×16 &&<br>                !direct_8×8_inference_flag ) )<br>            transform_size_8×8_flag | 2 | ae(v) |
|    }<br>    if( CodedBlockPatternLuma > 0 \|\| CodedBlockPatternChroma > 0 \|\|<br>        MbPartPredMode( MbType, 0 ) = = Intra_16×16 ) {<br>        mb_qp_delta | 2 | ae(v) |
|        residual_in_scalable_extension( ) | 3 \| 4 | |
|    }<br>}<br>} | | |

In the first column and second row of Table 1, a parameter of "base_layer_id_plus1" has a value obtained by adding 1 to a parameter of "base_layer_id". If the macroblock of the lower layer picture corresponding to a macroblock of a current layer picture exists, an identification number of the lower layer is allocated to the base_layer_id and, otherwise, "−1" is allocated to the base_layer_id. The identification number of the layer has 0, 1, and 2, in the order starting from the lowermost layer. Accordingly, the condition that the parameter of "base_layer_id_plus1" is not zero means that the macroblock of the lower layer picture corresponding to the macroblock of the current layer picture exists, i.e., that the current layer picture is a synchronized picture.

A parameter of "adaptive_prediction_flag" decides whether to encode a layer with reference to the lower layer. In the case where the parameter is zero, it represents a case of independent encoding without reference to the lower layer, and in the case where the parameter is not zero, it represents a case of encoding with reference to the lower layer.

Accordingly, the condition expressed in the first column and second row of Table 1 means that "base_layer_ide_plus1" is not zero, and "adaptive_prediction_flag" is not zero. As such, in the conventional JSVM, as in the first column and third row, "base_layer_mode_flag" is set only for the synchronized picture where "base_layer_id_plus1" is zero. Accordingly, it can be appreciated that the macroblock where "base_layer_mode_flag" is set has been encoded using information of the lower layer in a subsequent encoder or decoder process.

However, as proposed in the present invention, in order to encode the macroblock included in the unsynchronized picture using the information of the lower layer, it is required to change the definition of the parameter of "base_layer_id_plus1", and to add and modify other necessary syntaxes. In the present invention, modification of the JSVM 1.0 document is named as "modification JSVM".

In the present invention, not only for the macroblock of the synchronized picture having the corresponding lower layer picture but also for the macroblock of the unsynchronized picture not having the corresponding lower layer picture, their "base_layer_id_plus1" are not expressed as zero, and identification number+1 of their lower layers are recorded. That is, "base_layer_id_pluse1" is recorded as zero only in the macroblock of the lowermost layer picture where the lower layer itself does not exist, and has a value of the identification number+1 of the lower layer in other macroblocks.

As such, together with the modification of the definition of "base_layer_id_plus1", two conditions are further added in a condition statement of the first column and second row, and the first column and second row are modified as in Table 2 below.

TABLE 2

| if( base_layer_id_plus1 ! = 0 && adaptive_prediction_flag &&<br>        ( poc_diff ( currPic, basePic ) == 0 \|\| ! intra_base_mb<br>        ( CurrMbAddr ) )<br>{ |
|---|

As shown in Table 2, compared to the conventional JSVM, two conditions connected using "or (\|\|)" are further added. First, "poc_diff (currPic, basePic)==0" means that a temporal distance between the current layer picture and the base picture, i.e., the POC difference, is zero. Further, "! intra_base_mb (CurrMbAddr)" means that a macroblock of the current layer picture is not an intra macroblock, that is, is an inter macroblock.

First, if the POC difference becomes zero, encoding can be performed using the information of the lower layer irrespective of whether the macroblock of the lower layer picture being at the same temporal position as the macroblock of the current layer picture is in any mode (intra mode or inter mode). In the conventional JSVM, if "base_layer_id_plus1" is not zero, the POC difference becomes zero by itself and therefore, a determination process such as "poc_diff (currPic, basePic)==0" is not required, but in the modified JSVM according to the present invention, although "base_layer_id_plus1" is not zero, the POC difference can be zero (in the case of synchronized picture) or not (in the case of unsynchronized picture).

Further, "! intra_base_mb (CurrMbAddr)" is a syntax added to use a motion prediction method of the unsynchronized picture proposed in the present invention despite having different POCs if the macroblock of the current layer picture is the inter block. Accordingly, the two added conditions are connected using "or (\|\|)", and are connected with other conditions using "and (&&)". In the modified JSVM of the present invention, when a condition of Table 2 is satisfied, a value of 'TRUE' is allocated as "base_layer_mode_flag" to the macroblock of the current layer picture.

Meantime, it is required to also modify some expressions of "Residual in scalable extension syntax" of a JSVM 1.0 document shown in Table 3 below.

TABLE 3

| | C | Descriptor |
|---|---|---|
| ```
residual_in_scalable_extension( ) {
    if(base_id_plus1 != 0 && adaptive_prediction_flag &&
        MbPartPredType( mb_type, 0 ) != Intra_16x16 &&
        MbPartPredType( mb_type, 0 ) != Intra_8x8 &&
        MbPartPredType( mb_type, 0 ) != Intra_4x4 &&
        MbPartPredType( mb_type, 0 ) != Intra_Base )
        residual_prediction_flag
``` | 3 \| 4 | ae(v) |
| ```
    if( MbPartPredMode( mb_type, 0 ) = = Intra_16x16)
        residual_block_cabac( Intra16x16DCLevel, 16 )
``` | 3 | |
| ```
    for( i8x8 = 0; i8x8 < 4; i8x8++ ) /* each luma 8x8 block */
        if( !transform_size_8x8_flag )
            for( i4x4 = 0; i4x4 < 4; i4x4++ ) { /* each 4x4 sub-block of block */
                if( CodedBlockPatternLuma & ( 1 << i8x8 ) )
                    if( MbPartPredMode( mb_type, 0 ) = = Intra_16x16)
                        residual_block_cabac( Intra16x16ACLevel[i8x8 * 4 + i4x4], 15 )
``` | 3 | |
| ```
                    Else
                        residual_block_cabac( LumaLevel[ i8x8 * 4 + i4x4 ], 16 )
``` | 3 \| 4 | |
| ```
                else if( MbPartPredMode( mb_type, 0 ) = = Intra_16x16)
                    for( i = 0; i < 15; i++)
                        Intra16x16ACLevel[ i8x8 * 4 + i4x4 ][ i ] = 0
                Else
                    for(i = 0; i < 16; i++ )
                        LumaLevel[ i8x8 * 4 + i4x4 ][ i ] = 0
            }
        else if( CodedBlockPatternLuma & ( 1 << i8x8 ) )
            residual_block_cabac( LumaLevel8x8[ i8x8 ], 64 )
``` | 3 \| 4 | |
| ```
        Else
            for( i = 0; i < 64; i++)
                LumaLevel8x8[ i8x8 ][ i ] = 0
    if( chroma_format_idc != 0 ) {
        NumC8x8 = 4 / ( SubWidthC * SubHeightC )
        for( iCbCr = 0; iCbCr < 2; iCbCr++ )
            if( CodedBlockPatternChroma & 3 ) /* chroma DC residual present */
                residual_block_cabac( ChromaDCLevel[ iCbCr ], 4 * NumC8x8 )
``` | 3 \| 4 | |
| ```
            Else
                for( i = 0; i < 4 * NumC8x8; i++)
                    ChromaDCLevel[ iCbCr ][ i ] = 0
        for( iCbCr = 0; iCbCr < 2; iCbCr++ )
            for( i8x8 = 0; i8x8 < NumC8x8; i8x8++ )
                for( i4x4 = 0; i4x4 < 4; i4x4++ )
                    if( CodedBlockPatternChroma & 2 )
                        /* chroma AC residual present */
                        residual_block_cabac( ChromaACLevel[ iCbCr ][ i8x8*4+i4x4 ],
                            15)
``` | 3 \| 4 | |
| ```
                    Else
                        for(i = 0; i < 15; i++)
                            ChromaACLevel[ iCbCr ][ i8x8*4+i4x4 ][ i ] = 0
}
``` | | |

As a condition for setting a flag of "residual_prediction_flag" for performing a conventional residual prediction of Table 3 to 'TRUE', several conditions are shown in the first column and second row. However, the residual prediction is applicable only to the synchronized picture, and the definition of "base_id_plus1" is somewhat modified in the modified JSVM and thus only the condition that "base_id_plus1" is not zero cannot ensure that it corresponds to the synchronized picture. Accordingly, in the modified JSVM, "poc_diff (currPic, basePic)==0", i.e., the condition that the POC difference is not zero, is added so that the first column and second row of Table 3 is modified as shown in Table 4.

TABLE 4

```
if(base_id_plus1 != 0 && adaptive_prediction_flag &&
    MbPartPredType( mb_type, 0 ) != Intra_16x16 &&
    MbPartPredType( mb_type, 0 ) != Intra_8x8 &&
    MbPartPredType( mb_type, 0 ) != Intra_4x4 &&
    MbPartPredType( mb_type, 0 ) != Intra_Base
    poc_diff( currPic, basePic ) == 0 )
```

Figure 11:
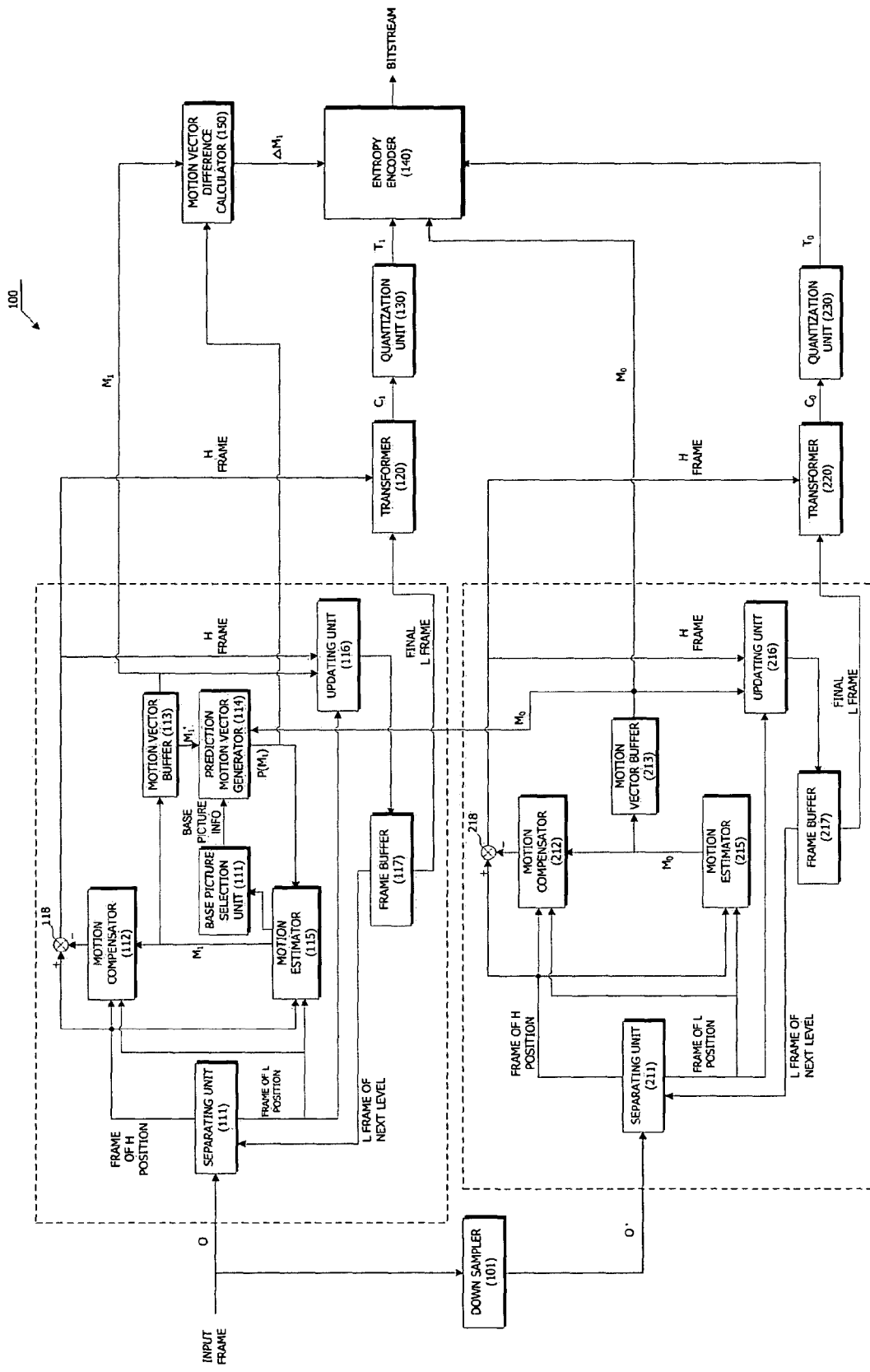
FIG. 11 is a block diagram illustrating the construction of a video encoder according to an exemplary embodiment of the present invention.

Hereinafter, the construction of a video encoder and a video decoder for embodying the methods proposed in the present invention will be explained. FIG. 11 is a block diagram illustrating the construction of a video encoder 100 according to an exemplary embodiment of the present invention. FIG. 11 exemplifies a case where only one current layer and one lower layer are provided, but those skilled in the art can appreciate that a similar application can be made to even in the case where three or more layers exist.

An initially input picture is input to a separation unit 111 of the current layer, and is temporally down-sampled, or is temporally or spatially down-sampled in a down-sampling unit 101 and then, is input to a separation unit 211 of the lower layer. For example, the down-sampling unit 101 can allow the frame rate of the lower layer to have a half of the current layer, or allow the frame rate and the resolution to have halves of the current layer, respectively.

First, an operation performed on the current layer will be described. The separation unit 111 separates an input picture 0 as an picture of a high frequency picture position (H position), and as an picture in a low frequency picture position (L position). In general, the high frequency picture is positioned at an odd-numbered position 2i+1, and a low frequency picture at an even-numbered position 2i. Here, "i" denoting the index representing an picture number has an integer value of greater than zero. The pictures at the H position pass through a temporal prediction process (Here, temporal prediction means prediction of the texture, not prediction of the motion vector), and pictures at the L position pass through an updating process.

The picture at the H position is input to a motion estimator 115, a motion compensator 112, and a difference engine 118.

A motion estimator 113 performs the motion estimation of a picture (hereinafter referred to as "current picture"), being at the H position, with reference to a peripheral picture (picture in the same layer but in different temporal positions), thereby obtaining the motion vector. The peripheral picture referred as above is called "reference picture".

In general, a block matching algorithm is widely used for the motion estimation. That is, as a given block is moving in a unit of pixel or sub-pixel in a specific search area of a reference picture, a displacement where its error is minimized is estimated as the motion vector. For the motion estimation, a fixed block matching method or a hierarchical method using a hierarchical variable size block matching (HVSBM) may be used.

In the motion estimation of the current layer picture, the efficiency of motion estimation can be enhanced using the motion vector previously obtained from the picture belonging to the lower layer (hereinafter referred to as "lower layer picture"). As in the example of FIG. 9, the predicted motion vector 24 predicted in the lower layer is provided as an initial value, and the motion vector search is performed within the motion search area 23.

As the predicted motion vector 24 for the synchronized picture, the motion vector at the corresponding block position of the lower layer picture being at the same temporal position can be used as it is. If the resolutions of the current layer and the lower layer are different, the lower layer motion vector is multiplied by a resolution multiple to be used as the predicted motion vector 24.

In order to obtain the predicted motion vector 24 for the unsynchronized picture, as described above, the base picture for the current picture should be first selected. This selection of the base picture is performed in a base picture selector 111 according to an inquiry command of the motion estimator 115, and the information on the selected base picture (base picture information) is provided to generate the predicted motion vector through a predicted motion vector generator 114.

As described above, a picture, which exists in the same GOP as that of the current unsynchronized picture among the lower layer pictures and has the least POC difference from the current unsynchronized picture among the high frequency pictures existing at the uppermost temporal level, is selected as the base picture. When there is two or more pictures having the same POC, an picture where the POC is relatively small is selected.

The predicted motion vector generator 114 requests a motion vector $M_0$ of the base picture from a motion vector buffer 213 of the lower layer through the provided base picture information (for example, the picture number POC and GOP number of the selected base pictures), and generates the predicted motion vector for a predetermined block (macroblock or sub-macroblock) of the current layer picture using the motion vector $M_0$. The method for generating the predicted motion vector has been described with reference to FIGS. 3 to 6 and thus explanation thereof will be omitted.

Referring to FIG. 11, the predicted motion vector generator 114 receives $M_0$ and $M_1'$ as its input signals, and generates $P(M_1)$ that is a predicted motion vector for $M_1$. That is, depending on the reference direction, the predicted motion vector may be generated directly from the motion vector $M_0$ or with reference the motion vector $M_1'$ of a different reference direction previously generated and stored in a motion vector buffer 113. In an example of FIG. 3, $M_0$ corresponds to $M_{Of}$, and from this, the predicted motion vector $P(M_1')$ for $M_1'$ corresponding to the $M_f$ will be obtained. Subsequently, the predicted motion vector $P(M_1)$ for $M_1$ corresponding to $M_b$ will be obtained using $M_0$ and the previously generated $M_1'$.

If the predicted motion vector is obtained as described above, the motion estimator 115 performs motion estimation within a predetermined motion search range with an initial position that is a position represented by the predicted motion vector. At the time of the motion estimation, an optimum motion vector can be determined by obtaining the motion vector having a minimum cost function and, together with this, an optimal macroblock pattern can also be determined in the case where the HVSBM is used. The cost function can also employ, for example, a rate-distortion function.

The motion vector buffer 113 stores the motion vector obtained in the motion estimator 115, and provides the stored motion vector to the predicted motion vector generator 114 according to an inquiry command of the predicted motion vector generator 114.

The motion compensator 112 performs motion compensation for the current picture using the motion vector obtained in the motion estimator 115 and the reference picture. Further, the difference engine 118 obtains the difference of the current picture and the motion compensation picture provided by the motion compensator 112, thereby generating a high frequency picture (H picture). The high frequency picture is called a residual picture having a meaning of the residual result. The generated high frequency pictures are provided to an updating unit 116 and a transformer 120.

The updating unit 116 updates pictures at an L position using the generated high frequency picture. In a 5/3 MCTF, pictures at the L position will be updated using two temporally adjacent high frequency pictures. If the unidirectional (forward or reverse direction) reference is used in the process of generating the high frequency picture, the updating process can be unidirectionally performed. A more detailed relational expression for an MCTF updating process is well known in the art and thus the detailed explanation thereof will be omitted.

The updating unit 116 stores the updated pictures at the L position in a frame buffer 117, and the frame buffer 117 provides the stored picture at the L position to a separating unit 111 for a process of separating the MCTF at a subsequent lower temporal level. However, if the picture at the L position is a final L picture, a lower temporal level no longer exists. Therefore, the final L picture is provided to the transformer 120.

The separating unit 111 separates the pictures provided from the frame buffer 117 as an picture at an H position and an picture of an L position at a subsequent lower temporal level. In a similar manner, a temporal prediction process and an updating process are performed at a subsequent lower temporal level. The repetitive MCTF separating process can be repeatedly performed until one L picture finally remains.

The transformer 120 performs spatial transform and generates a transform coefficient C for the provided final L picture and H picture. The spatial transform process may employ methods such as a discrete cosine transform (DCT) and a wavelet transform. In the case of using the DCT, a DCT coefficient will be used as the transform coefficient, and in the case of using the wavelet transform, a wavelet coefficient will be used as the transform coefficient.

A quantizer 130 quantizes a transform coefficient $C_1$. The quantization refers to a process of representing the transform coefficient expressed by a predetermined real value, as a discrete value. For example, the quantizer 130 divides the transform coefficient expressed by the predetermined real value through a predetermined quantization step, and the quantization can be performed in such a manner that the division result is rounded off to an integer value. The quantization step can be provided from a predefined quantization table.

A motion vector difference calculator 150 calculates a difference $\Delta M_1$ between the motion vector $M_1$ from the motion vector buffer 113 and the predicted motion vector $P(M_1)$ for the motion vector $M_1$ provided from the predicted motion vector generator 114, and provides the calculated difference $\Delta M_1$ to an entropy encoder 140.

The encoding process of the lower layer is performed, using the separating unit 211, a motion compensator 212, the motion vector buffer 213, a motion estimator 215, an updating unit 216, a frame buffer 217, a transformer 220 and a quantization unit 230, in a manner similar to the encoding process of the current layer and thus the explanation thereof will be omitted. However, the lower layer does not have a referable lower layer and thus may not include processes of selection of the base picture, generation of the predicted motion vector, and calculation of the motion vector difference according to the present invention. Although the motion vector of the lower layer may be used to obtain the difference for an efficient compression, the motion vector of the lower layer will be described as being encoded without loss.

As a result, the motion vector of the current layer $M_1$, the quantization result of the current layer $T_1$, the motion vector of the lower layer $M_0$, and the quantization result of the lower layer $T_0$ are provided to the entropy encoder 140, respectively. The entropy encoder 140 encodes the provided $M_1$, $T_1$, $M_0$, and $T_0$ without loss, and generates a bit stream. As a lossless encoding method, Huffman coding, arithmetic coding, variable length coding, and other various coding methods may be used.

Figure 12:
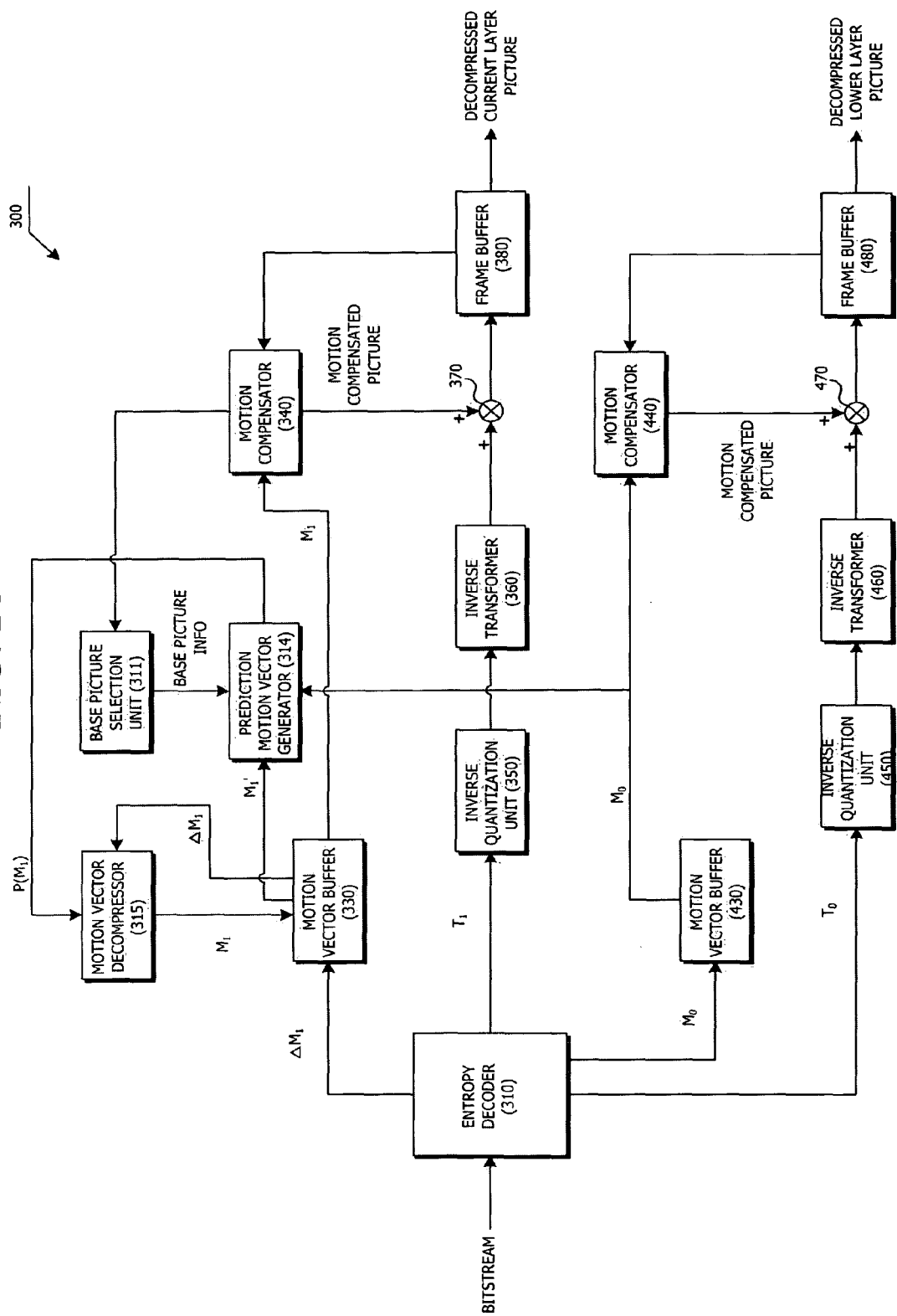
FIG. 12 is a block diagram illustrating the construction of a video decoder according to an exemplary embodiment of the present invention.

FIG. 12 is a block diagram illustrating the construction of a video decoder 300 according to an exemplary embodiment of the present invention.

An entropy decoder 310 performs lossless decoding, and decodes without loss the motion vector difference $\Delta M_1$ and the texture data $T_1$ of the current layer, and the motion vector $M_0$ and the texture data $M_1$ of the lower layer from the input bit stream. First, an operation performed on the current layer will be described.

The decoded texture data $T_1$ is provided to an inverse quantizer 350, and the motion difference $\Delta M_1$ is provided to a motion vector buffer 330. A base picture selector 311 selects the base picture for the current layer picture according to the inquiry command from a motion compensator 340. The selection of the base picture can be performed using the same algorithm as in the base picture selector 311. Information on the selected base picture (for example, the picture number POC and GOP number of the selected base pictures) is provided to a predicted motion vector generator 314.

The predicted motion vector generator 314 requests the motion vector $M_0$ of the base picture from the motion vector buffer 430 of the lower layer through the provided base picture information, and generates the predicted motion vector $P(M_1)$ for a predetermined block (macroblock or sub-macroblock) of the current layer picture using the motion vector $M_0$.

However, in any one case, the predicted motion vector can be directly generated from $M_0$ depending on the reference direction but, in other cases, the motion vector $M_1'$ of a different reference direction previously generated and stored in the motion vector buffer 330 are also required. In an example in FIG. 3, it can be appreciated that the predicted motion vector $P(M_b)$ of $M_b$ cannot be obtained from the determined $M_f$ and $M_{of}$ until $M_f$ is previously determined.

A motion vector decompression unit 315 adds the predicted motion vector $P(M_1)$ generated from the predicted motion vector generator 314 and the motion vector difference $\Delta M_1$ decoded in the entropy decoder 310, and decompresses the motion vector $M_1$. The decompressed motion vector $M_1$ is again temporarily stored in the motion vector buffer 330, and is provided to the motion compensator 340 according to the inquiry command from the motion compensator 340.

The inverse quantizer 350 inversely quantizes the texture data $T_1$ provided from the entropy decoder 310. During the inverse quantization, a value matched to the index is decompressed from the index generated through the quantization process, using the same quantization table as that used in the quantization process.

An inverse quantizer 360 performs inverse transform on the result of inverse quantization. The inverse transform is performed by a method corresponding to the transformer 120 of the video encoder 100 and, in detail, can employ an inverse DCT transform, an inverse wavelet transform, and the like. As the result of inverse transform, that is, a decompressed high frequency picture is provided to an adder 370.

The motion compensator 340 generates the motion compensation picture using the reference picture (previously decompressed and stored in a frame buffer 380) for the current layer picture, and provides the generated motion compensation picture to the adder 370. Such a motion compensation process can be performed in the reverse order to the order of an MCTF separation, i.e., in the reverse order to the temporal level according to the MCTF decompression order.

The adder 370 adds the high frequency picture provided from the inverse transformer 360 and the motion compensated picture, decompresses any picture of a current temporal level, and stores the decompressed picture in the frame buffer 380.

A decoding process of the lower layer is performed, using a motion vector buffer 430, a motion compensator 440, an inverse quantization unit 450, an inverse transformer 460, an adder 470 and a frame buffer 480, in a manner similar to the decoding process of the current layer and thus the explanation thereof will be omitted. However, the lower layer does not have a further lower layer that can be referenced, and thus the processes of selecting the base picture, generating the predicted motion vector, and calculating the motion vector difference are not applied.

FIG. 13 is a diagram illustrating the construction of a system for performing an operation of the video encoder 100 or the video decoder 300 according to an exemplary embodiment of the present invention. The system can employ a television (TV) set, a set-top box, a desktop computer, a laptop computer, a palmtop computer, a personal digital assistant (PDA), a video or picture storage device (e.g., video cassette recorder (VCR) and a digital video recorder (DVR)). The system may be also a combination of the above devices, or be the device partially included in other devices. The system can include at least one video source 910, at least one input/output device 920, a processor 940, a memory 950, and a display device 930.

The video source 910 may be a TV receiver, a VCR, or other video storage units. Further, the video source 910 may be at least one network connection for receiving a video from a server connected the Internet, a wide area network (WAN), a local area network (LAN), a terrestrial broadcast system, a cable network, a satellite communication network, a wireless network, and a telephone network. The source can also be a combination of the networks or a network partially included in other networks.

The input/output device 920, the processor 940, and the memory 950 communicate through a communication medium 960. The communication medium 960 may be a communication bus, a communication network, or at least one internal connection circuit. Video data received from the video source 910 can be processed by the processor 940 according to at least one software program stored in the memory 950, and can be executed by the processor 940 in order to generate an output video picture to be provided to the display device 930.

In particular, the software program stored in the memory 950 may include a scalable video codec executing a method according to the present invention. The encoder or the codec can be stored in the memory 950, and may be read from a storage medium such as a CD-ROM or a floppy disk or may be downloaded from a predetermined server through a variety of networks. It can be substituted with a hardware circuit, or can be substituted with a combination of software and the hardware circuit.

As described above, according to the present invention, motion vectors of an picture having no corresponding lower layer picture can be encoded more efficiently.

Further, the present invention can provide a method for efficiently predicting motion vectors of an unsynchronized picture using motion vectors of a lower layer in a multilayer-based scalable video codec where each layer has an MCTF structure.

Furthermore, the present invention can improve the performance of a JSVM by applying a motion vector prediction technique of the unsynchronized picture to the JSVM.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for compressing motion vectors of an unsynchronized picture belonging to a current layer in a video encoder based on a multilayer having at least the current layer and a lower layer, the method comprising:
   selecting a base picture for the unsynchronized picture;
   generating a predicted motion vector of the unsynchronized picture of the current layer from a motion vector of the base picture;
   subtracting the predicted motion vector from a motion vector of the unsynchronized picture; and
   encoding a result of subtracting,
   wherein the unsynchronized picture does not have a corresponding lower layer picture at a same temporal position.

2. The method as claimed in claim 1, wherein each of the current layer and the lower layer has a temporal level structure obtained by motion compensated temporal filtering.

3. The method as claimed in claim 2, wherein the base picture is selected as a picture having the closest temporal distance to the unsynchronized picture, from high frequency pictures existing at an uppermost temporal level in the lower layer.

4. The method as claimed in claim 3, wherein the unsynchronized picture and the base picture belong to a same group of pictures.

5. The method as claimed in claim 4, wherein the base picture is selected as a picture having a least picture order count from a plurality of lower layer pictures having a same temporal distance.

6. The method as claimed in claim 1, further comprising obtaining the motion vector of the unsynchronized picture by performing motion estimation within a predetermined search area with an initial value that corresponds to the predicted motion vector.

7. The method as claimed in claim 6, wherein the obtaining the motion vector of the unsynchronized picture is performed by maintaining a sub-macroblock pattern of the unsynchronized picture which is identical to a sub-macroblock pattern of the base picture, and refining the motion vector of the unsynchronized picture.

8. The method as claimed in claim 7, wherein the sub-macroblock pattern and the motion vector of the unsynchronized picture are obtained independently of the sub-macroblock pattern of the base picture by a predetermined cost function.

9. The method as claimed in claim 2, wherein if the base picture has a bidirectional motion vector, the predicted motion vector is generated from a forward motion vector of the bidirectional motion vector if the unsynchronized picture is earlier in temporal position than the base picture, or the predicted motion vector is generated from a reverse motion vector of the bidirectional motion vector if the unsynchronized picture is later in temporal position than the base picture.

10. The method as claimed in claim 2, wherein the generating the predicted motion vector of the current layer comprises multiplying the motion vector of the base picture by a reference distance coefficient.

11. The method as claimed in claim 2, wherein the generating the predicted motion vector of the current layer comprises:
   multiplying the motion vector of the base picture by a reference distance coefficient, and generating a predicted motion vector for a forward motion vector of the unsynchronized picture; and
   generating a predicted motion vector for a reverse motion vector of the unsynchronized picture by subtracting the motion vector of the base picture from the forward motion vector of the unsynchronized picture if the motion vector of the base picture is a forward motion vector, or adding the forward motion vector of the unsynchronized picture and the motion vector of the base picture if the motion vector of the base picture is a reverse motion vector.

12. The method as claimed in claim 2, wherein, if resolutions of the current layer and the lower layer are different from each other, the generating the predicted motion vector of the current layer comprises the steps of:
   multiplying the motion vector of the base picture by a reference distance coefficient and a resolution multiple, and generating a predicted motion vector for a forward motion vector of the unsynchronized picture; and
   generating a predicted motion vector for a reverse motion vector of the unsynchronized picture by subtracting a value obtained by multiplying the motion vector of the base picture and the resolution multiple from the forward motion vector of the unsynchronized picture if the motion vector of the base picture is a forward motion vector, or adding the value obtained by multiplying the motion vector of the base picture and the resolution multiple to the forward motion vector of the unsynchronized picture if the motion vector of the base picture is a reverse motion vector.

13. A method for decompressing motion vectors of an unsynchronized picture belonging to a current layer in a video decoder based on a multilayer having at least the current layer and a lower layer, the method comprising:
    selecting a base picture for the unsynchronized picture;
    generating a predicted motion vector of the unsynchronized picture of the current layer from a motion vector of the base picture; and
    adding a motion vector difference for the unsynchronized picture to the predicted motion vector,
    wherein the unsynchronized picture does not have a corresponding lower layer picture at a same temporal position.

14. The method as claimed in claim 13, wherein each of the current layer and the lower layer has a temporal level structure obtained by motion compensated temporal filtering.

15. The method as claimed in claim 14, wherein the base picture is selected as an picture having a closest temporal distance to the unsynchronized picture, from high frequency pictures existing at an uppermost temporal level in the lower layer.

16. The method as claimed in claim 15, wherein the unsynchronized picture and the base picture belong to a same group of pictures.

17. The method as claimed in claim 16, wherein the base picture is selected as a picture having a least picture order count from a plurality of lower layer pictures having a same temporal distance.

18. The method as claimed in claim 14, wherein if the base picture has a bidirectional motion vector, the predicted motion vector is generated from a forward motion vector of the bidirectional motion vector if the unsynchronized picture is earlier in temporal position than the base picture, or the predicted motion vector is generated from a reverse motion vector of the bidirectional motion vector if the unsynchronized picture is later in temporal position than the base picture.

19. The method as claimed in claim 14, wherein the generating the predicted motion vector of the current layer comprises multiplying the motion vector of the base picture by a reference distance coefficient.

20. The method as claimed in claim 14, wherein the generating the predicted motion vector of the current layer comprises:
    multiplying the motion vector of the base picture by a reference distance coefficient, and generating a predicted motion vector for a forward motion vector of the unsynchronized picture; and
    generating a predicted motion vector for a reverse motion vector of the unsynchronized picture by subtracting the motion vector of the base picture from the forward motion vector of the unsynchronized picture if the motion vector of the base picture is a forward motion vector, or adding the forward motion vector of the unsynchronized picture and the motion vector of the base picture if the motion vector of the base picture is a reverse motion vector.

21. The method as claimed in claim 14, wherein, if resolutions of the current layer and the lower layer are different from each other, the generating the predicted motion vector of the current layer comprises:
    multiplying the motion vector of the base picture by a reference distance coefficient and a resolution multiple, and generating a predicted motion vector for a forward motion vector of the unsynchronized picture; and
    generating a predicted motion vector for a reverse motion vector of the unsynchronized picture by subtracting a value obtained by multiplying the motion vector of the base picture and the resolution multiple from the forward motion vector of the unsynchronized picture if the motion vector of the base picture is a forward motion vector, or adding the value obtained by multiplying the motion vector of the base picture and the resolution multiple to the forward motion vector of the unsynchronized picture if the motion vector of the base picture is a reverse motion vector.

22. An apparatus for compressing motion vectors of an unsynchronized picture belonging to a current layer in a video encoder based on a multilayer having at least the current layer and a lower layer, the apparatus comprising:
    means for selecting a base picture for the unsynchronized picture;
    means for generating a predicted motion vector of the unsynchronized picture of the current layer from a motion vector of the base picture;
    means for subtracting the predicted motion vector from a motion vector of the unsynchronized picture; and
    means for encoding a result of subtracting,
    wherein the unsynchronized picture does not have a corresponding lower layer picture at a same temporal position.

23. An apparatus for decompressing motion vectors of an unsynchronized picture belonging to a current layer in a video decoder based on a multilayer having at least the current layer and a lower layer, the apparatus comprising:
    means for selecting a base picture for the unsynchronized picture;
    means for generating a predicted motion vector of the unsynchronized picture of the current layer from a motion vector of the base picture; and
    means for adding a motion vector difference for the unsynchronized picture to the predicted motion vector,
    wherein the unsynchronized picture does not have a corresponding lower layer picture at a same temporal position.

24. The apparatus as claimed in claim 22, further comprising means for obtaining the motion vector of the unsynchronized picture by performing motion estimation within a predetermined search area with an initial value that corresponds to the predicted motion vector,
    the means for obtaining the motion vector of the unsynchronized picture obtains the motion vector of the unsynchronized picture by maintaining a sub-macroblock pattern of the unsynchronized picture which is identical to a sub-macroblock pattern of the base picture, and refining the motion vector of the unsynchronized picture, and
    the sub-macroblock pattern and the motion vector of the unsynchronized picture are obtained independently of the sub-macroblock pattern of the base picture by a predetermined cost function.

25. The apparatus as claimed in claim 22, wherein the means for generating the predicted motion vector of the current layer generated the predicted motion vector of the current layer by:
- multiplying the motion vector of the base picture by a reference distance coefficient, and generating a predicted motion vector for a forward motion vector of the unsynchronized picture; and
- generating a predicted motion vector for a reverse motion vector of the unsynchronized picture by subtracting the motion vector of the base picture from the forward motion vector of the unsynchronized picture if the motion vector of the base picture is a forward motion vector, or adding the forward motion vector of the unsynchronized picture and the motion vector of the base picture if the motion vector of the base picture is a reverse motion vector.

26. The apparatus as claimed in claim 23, wherein the means for generating the predicted motion vector of the current layer generates the predicted motion vector of the current layer by:
- multiplying the motion vector of the base picture by a reference distance coefficient, and generating a predicted motion vector for a forward motion vector of the unsynchronized picture; and
- generating a predicted motion vector for a reverse motion vector of the unsynchronized picture by subtracting the motion vector of the base picture from the forward motion vector of the unsynchronized picture if the motion vector of the base picture is a forward motion vector, or adding the forward motion vector of the unsynchronized picture and the motion vector of the base picture if the motion vector of the base picture is a reverse motion vector.

* * * * *